US008233473B2

(12) United States Patent
Ishibashi

(10) Patent No.: US 8,233,473 B2
(45) Date of Patent: Jul. 31, 2012

(54) IP TELEPHONE SYSTEM AND COMPUTER READABLE STORAGE MEDIUM

(75) Inventor: Masayuki Ishibashi, Hekinan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 940 days.

(21) Appl. No.: 12/245,160

(22) Filed: Oct. 3, 2008

(65) Prior Publication Data

US 2009/0092128 A1    Apr. 9, 2009

(30) Foreign Application Priority Data

Oct. 3, 2007  (JP) ................................. 2007-260217
Mar. 31, 2008  (JP) ................................. 2008-094055

(51) Int. Cl.
*H04L 12/66* (2006.01)
(52) U.S. Cl. ....................................................... 370/352
(58) Field of Classification Search ........................ None
See application file for complete search history.

(56) References Cited

U.S. PATENT DOCUMENTS

| 2002/0112058 | A1 | 8/2002 | Weisman et al. | |
|---|---|---|---|---|
| 2005/0141529 | A1 | 6/2005 | Miyajima et al. | |
| 2006/0067249 | A1* | 3/2006 | Poustchi et al. | 370/260 |
| 2006/0184660 | A1 | 8/2006 | Rao et al. | |
| 2007/0189266 | A1 | 8/2007 | Izumi et al. | |
| 2007/0286100 | A1* | 12/2007 | Saaranen et al. | 370/260 |

FOREIGN PATENT DOCUMENTS

| JP | H07-264298 A | 10/1995 |
|---|---|---|
| JP | 2000-092152 A | 3/2000 |
| JP | 2005-080025 | 3/2005 |
| JP | 2005-192086 | 7/2005 |
| WO | 2006034563 A1 | 6/2006 |

OTHER PUBLICATIONS

European Patent Office; European Search Report in Application No. 08253208.6 (counterpart to the above-captioned U.S. patent application) mailed Jul. 27, 2009.
Brijesh Kumar and Mahfuzar Rahman; Mobility Support for Universal Plug and Play (UPnP) Devices Using Session Initiation Protocol (SIP); Panasonic Digital Networking Laboratory (PDNL); 2005; pp. 788-792; 1-4244-0086-4/05; Panasonic; NJ, USA.
The State Intellectual Property Office of the People's Republic of China, Notification of First Office Action for Chinese Patent Application No. 200810168978.3 (counterpart to above-captioned patent application), issued Apr. 25, 2011.
Japan Patent Office, Office Action for Japanese Patent Application No. 2008-094055 (counterpart to above-captioned patent application), mailed Feb. 7, 2012.

* cited by examiner

*Primary Examiner* — Yong Zhou
(74) *Attorney, Agent, or Firm* — Baker Botts L.L.P.

(57) ABSTRACT

An IP telephone terminal includes an identification data receiving unit that receives, over an Internet, identification data identifying another IP telephone terminal. A communicating unit establishes IP telephone communications with the other IP telephone terminal identified by the identification data via the Internet. An IP telephone function controlling unit controls execution of an IP telephone function used to implement a telephone call with the other IP telephone terminal via a communicating unit that establishes IP telephone communications with the other IP telephone terminal. A terminal data acquiring unit acquires terminal data included in the identification data when acquisition data is determined to be included in the identification data. A process data transmission controlling unit controls transmission of a process data to the other IP telephone terminal, the process data being data used in the function identified by the terminal data acquired by the terminal data acquiring unit.

12 Claims, 18 Drawing Sheets

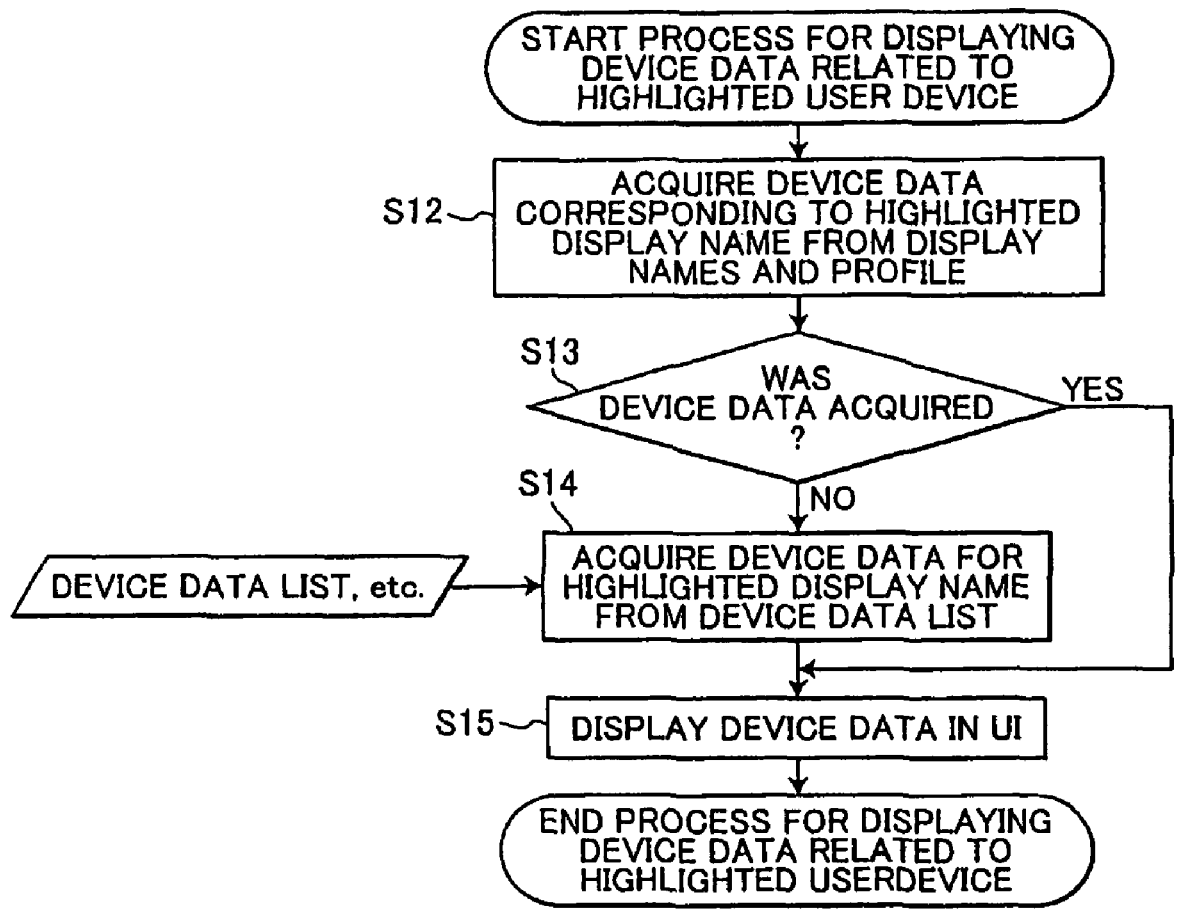

FIG.7

SEARCH FOR USER DEVICES

1. PLEASE SELECT THE SEARCH CRITERIA

DISPLAY NAME ▽

2. PLEASE SELECT THE FUNCTION OR TYPE OF DEVICE

◉ SEARCH BY DEVICE FUNCTION
   - ☑ PRINTER   ☐ FAX
   - ☐ SCANNER
   - ☐ MEDIA CARD READER

○ SEARCH BY DEVICE TYPE

INKJET PRINTER, MULTIFUNCTION DEVICE ▽

DEVICE MODEL
   - MFC-210C
   - MFC-410CN
   - MFC-420CN
   - MFC-610CLN
   - MFC-620CLN
   - MFC-110C
   - MFC-310CN
   - MFC-3140C

3. PLEASE PRESS THE SEARCH BUTTON

[SEARCH]

USER DEVICE SEARCH RESULTS

| DISPLAY NAME | ID |
|---|---|
| Br_mfc_420_yamada | Yamada_da |
| Br_mfc_420_takahoshi | Zefe_takah |
| Br_mfc_420_1969yama | 196911_ya |
| Br_mfc_420_dragons | dragonsZZ |
| Br_mfc_420_ito-san | ito_2005ae |

[INSERT SELECTED USER DEVICE INTO CONTACT LIST]   [CANCEL]

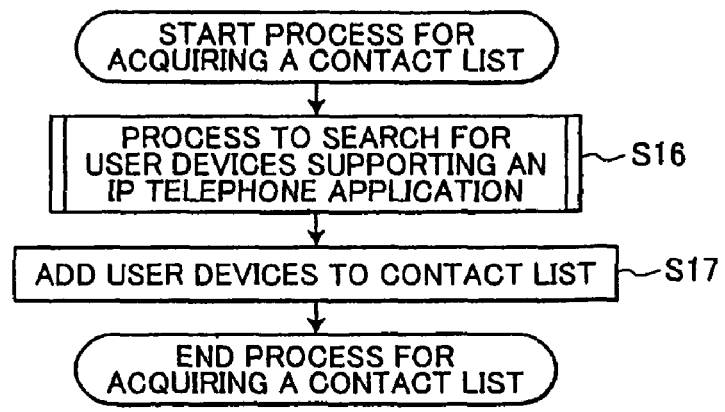
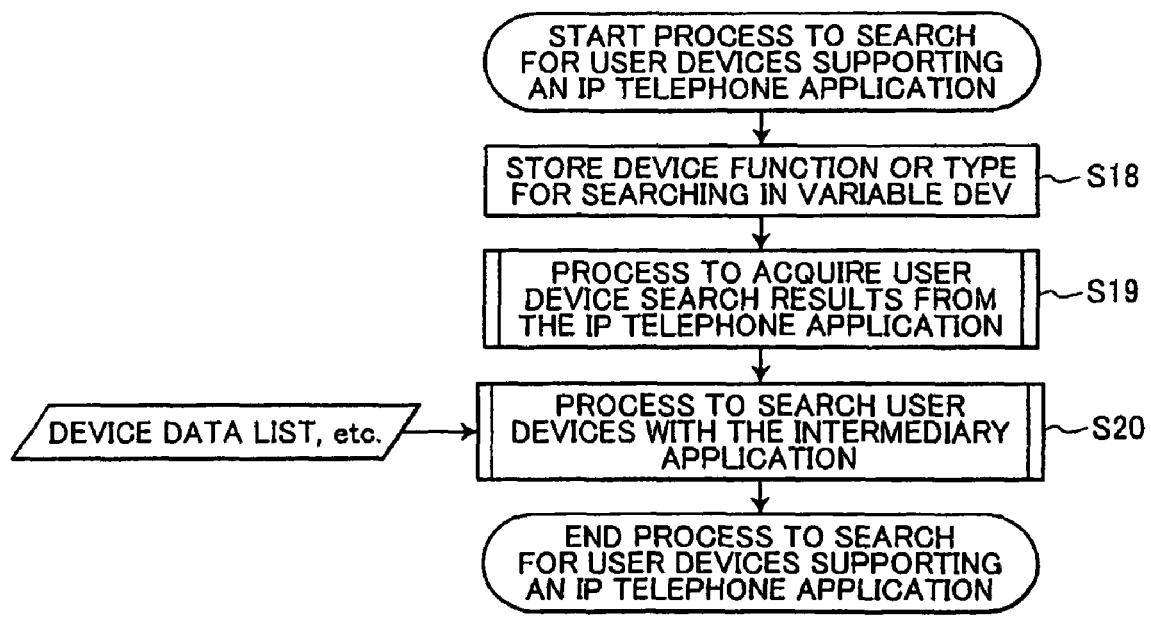

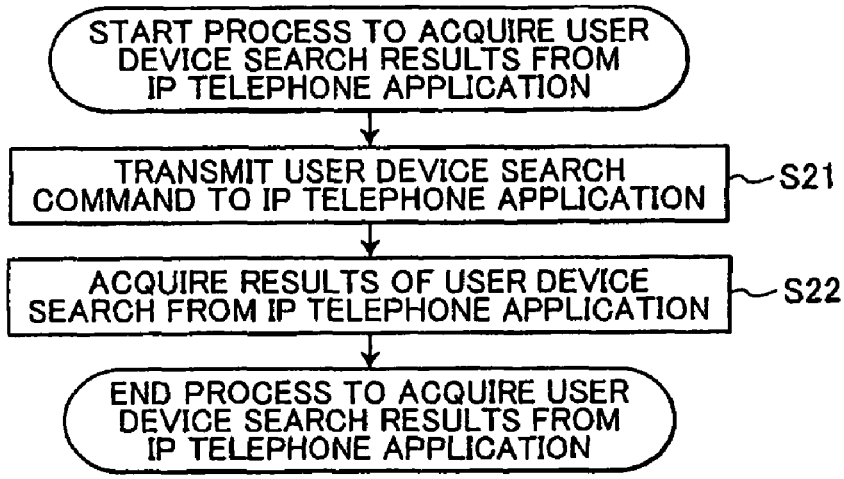
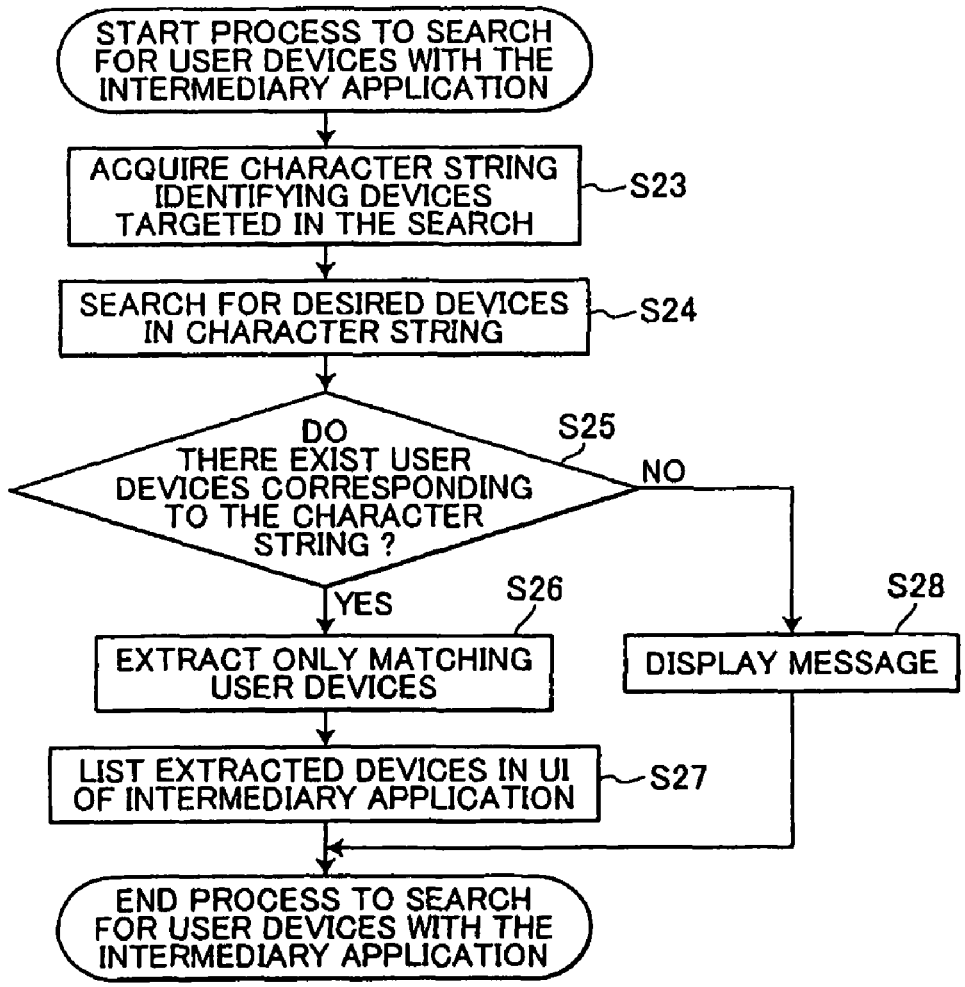

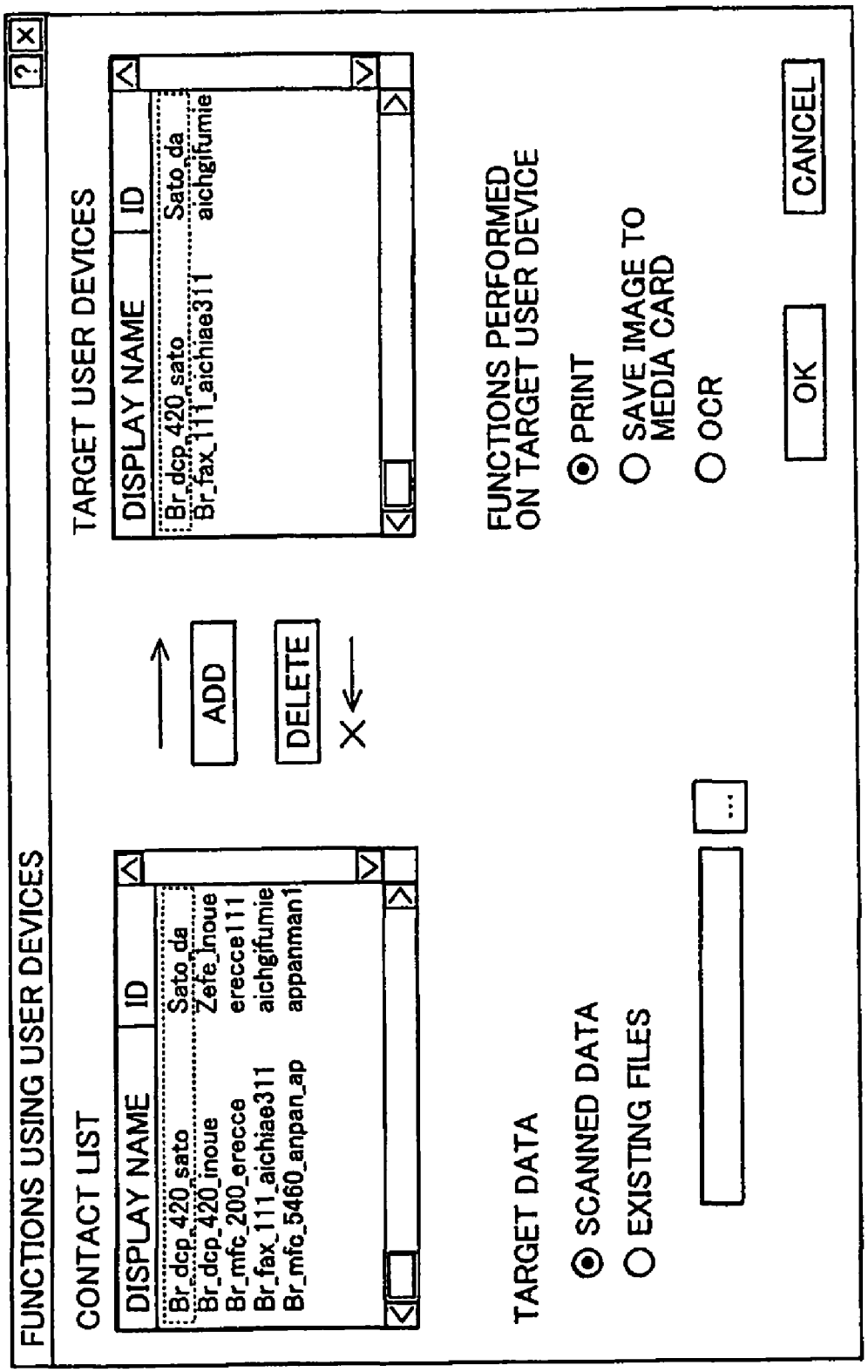

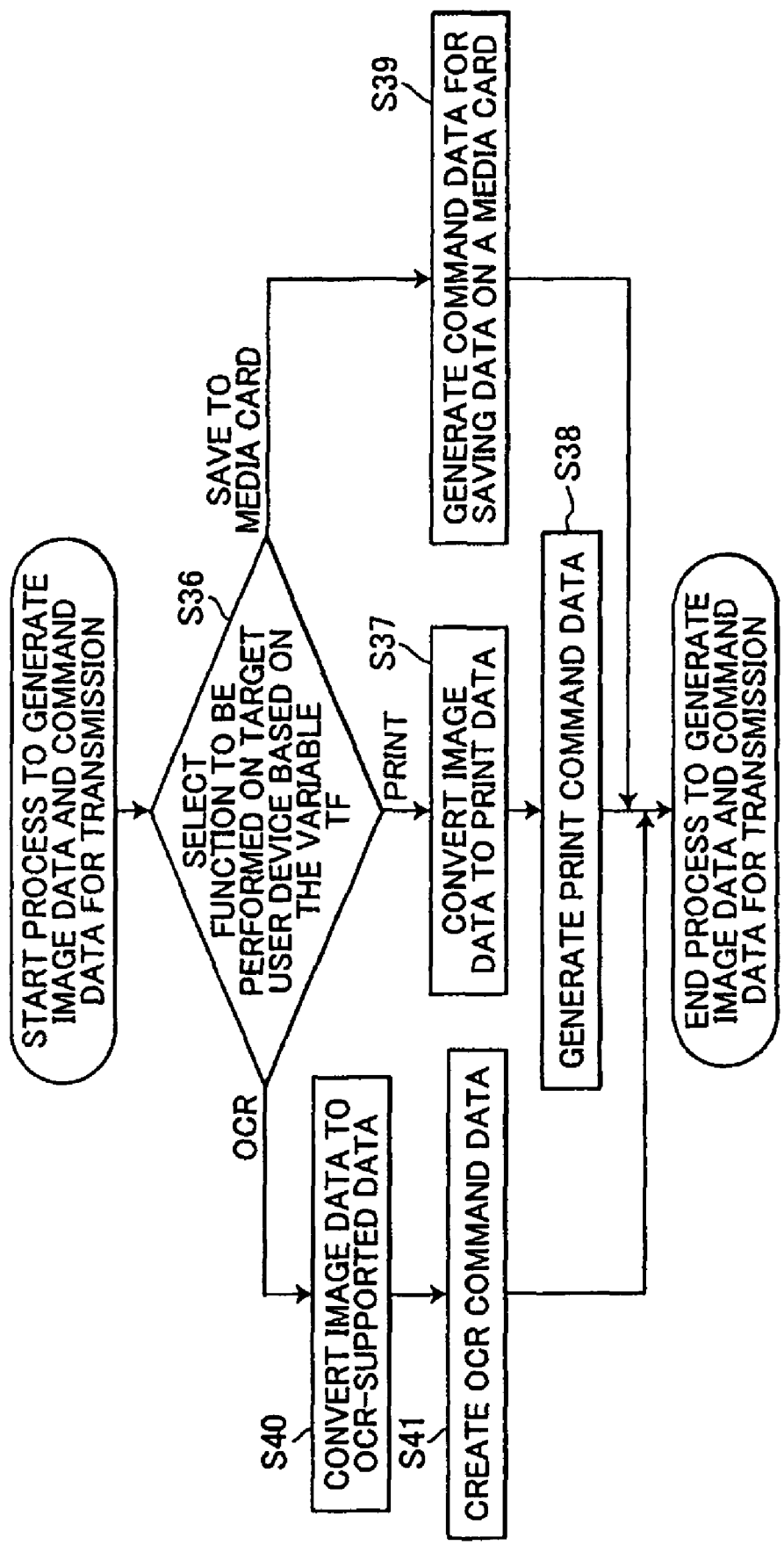

FIG.15

FIRMWARE TRANSMISSION PROGRAM

1. PLEASE SELECT THE SEARCH CRITERIA

DISPLAY NAME

SELECT DEVICE TYPE

INKJET PRINTER, MULTIFUNCTION DEVICE

DEVICE MODEL

- MFC-210C
- MFC-410CN
- MFC-420CN
- MFC-610CLN
- MFC-620CLN
- MFC-110C
- MFC-310CN
- MFC-3140C

FIRMWARE SELECTION

USER DEVICE SEARCH RESULTS

| DISPLAY NAME | ID |
|---|---|
| Br_mfc_420_yamada | Yamada_da |
| Br_mfc_420_takahoshi | Zefe_takah |
| Br_mfc_420_1969yama | 196911_ya |
| Br_mfc_420_dragons | dragonsZZ |
| Br_mfc_420_ito-san | ito 2005ae |

SEARCH

DEVICE DATA FOR SELECTED USER DEVICE

DEVICE NAME: BR MFC 420
DEVICE FUNCTIONS: PRINTER
SCANNER
FAX
MEDIA CARD SLOT

TRANSMIT   CANCEL

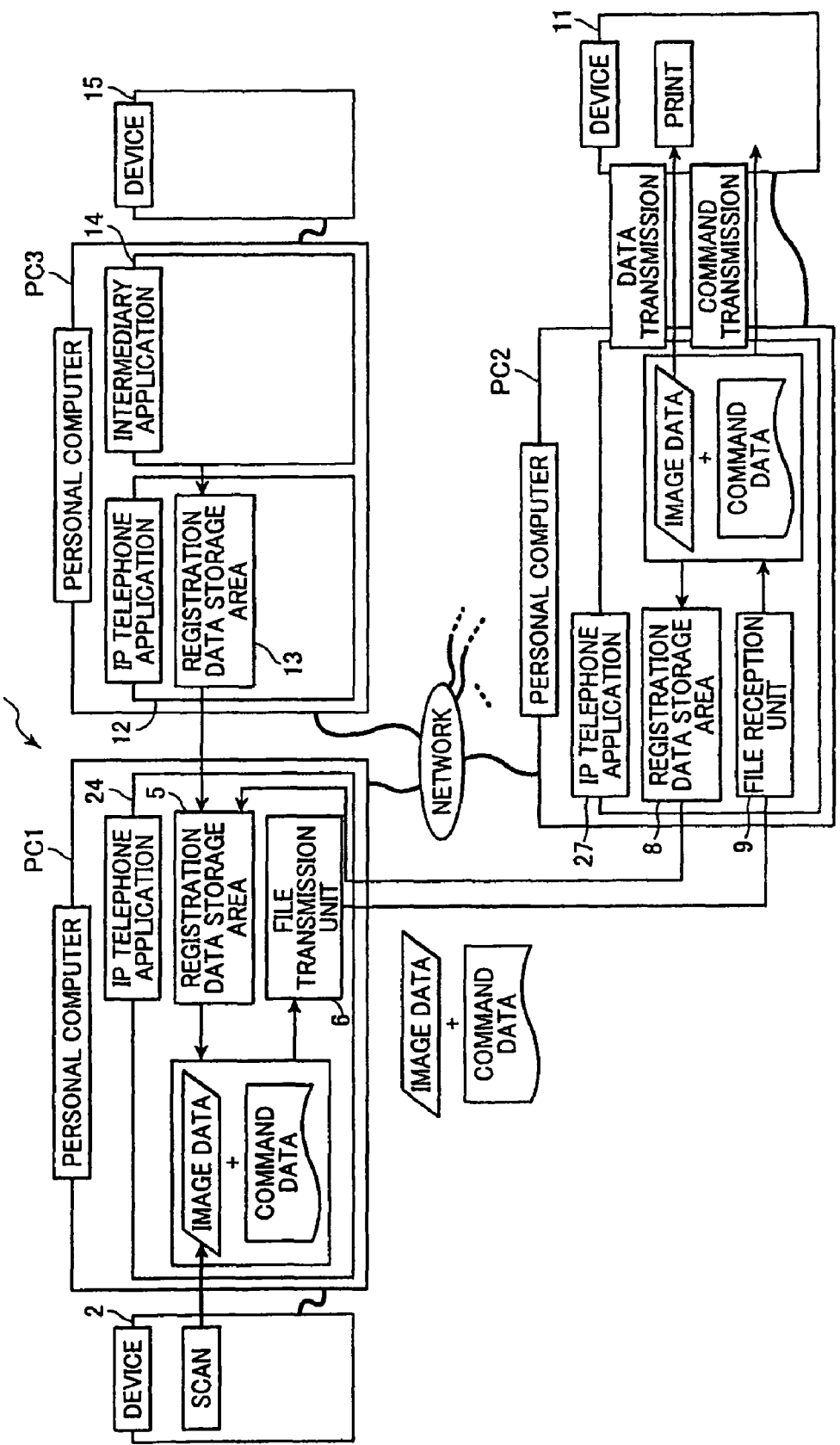

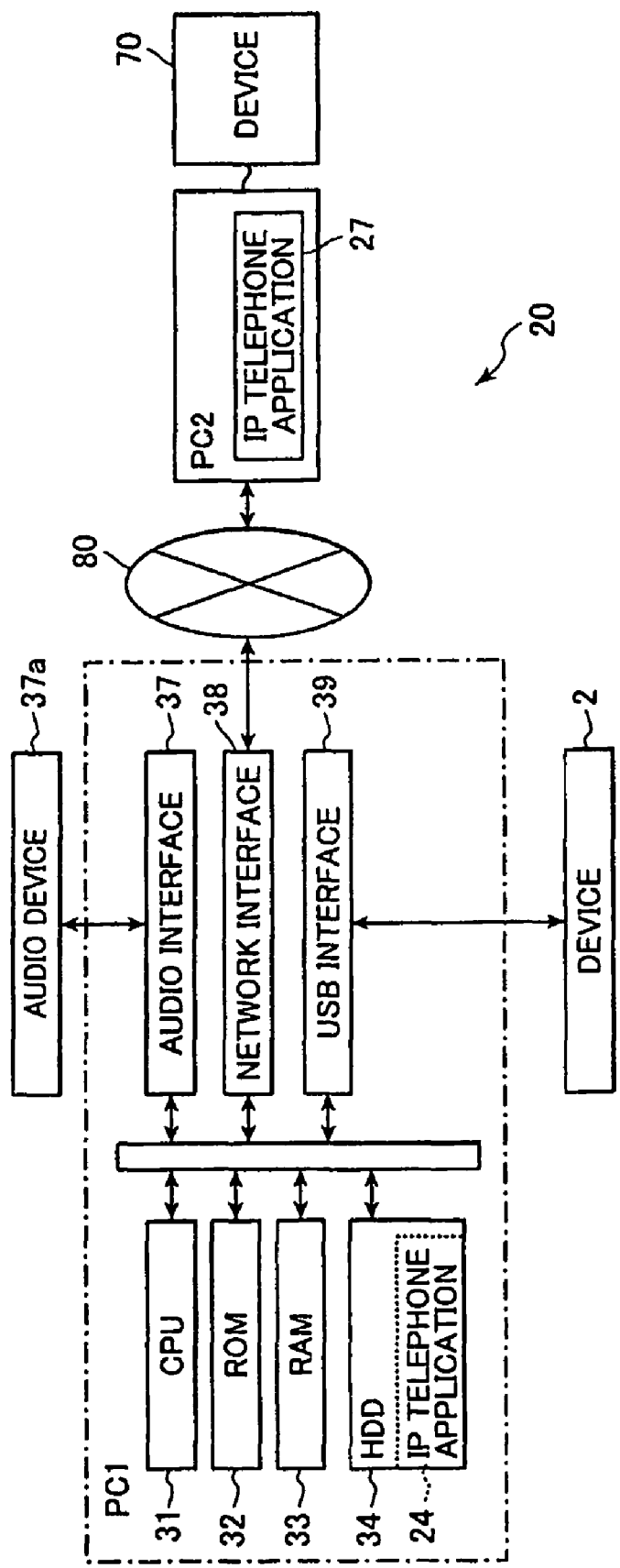

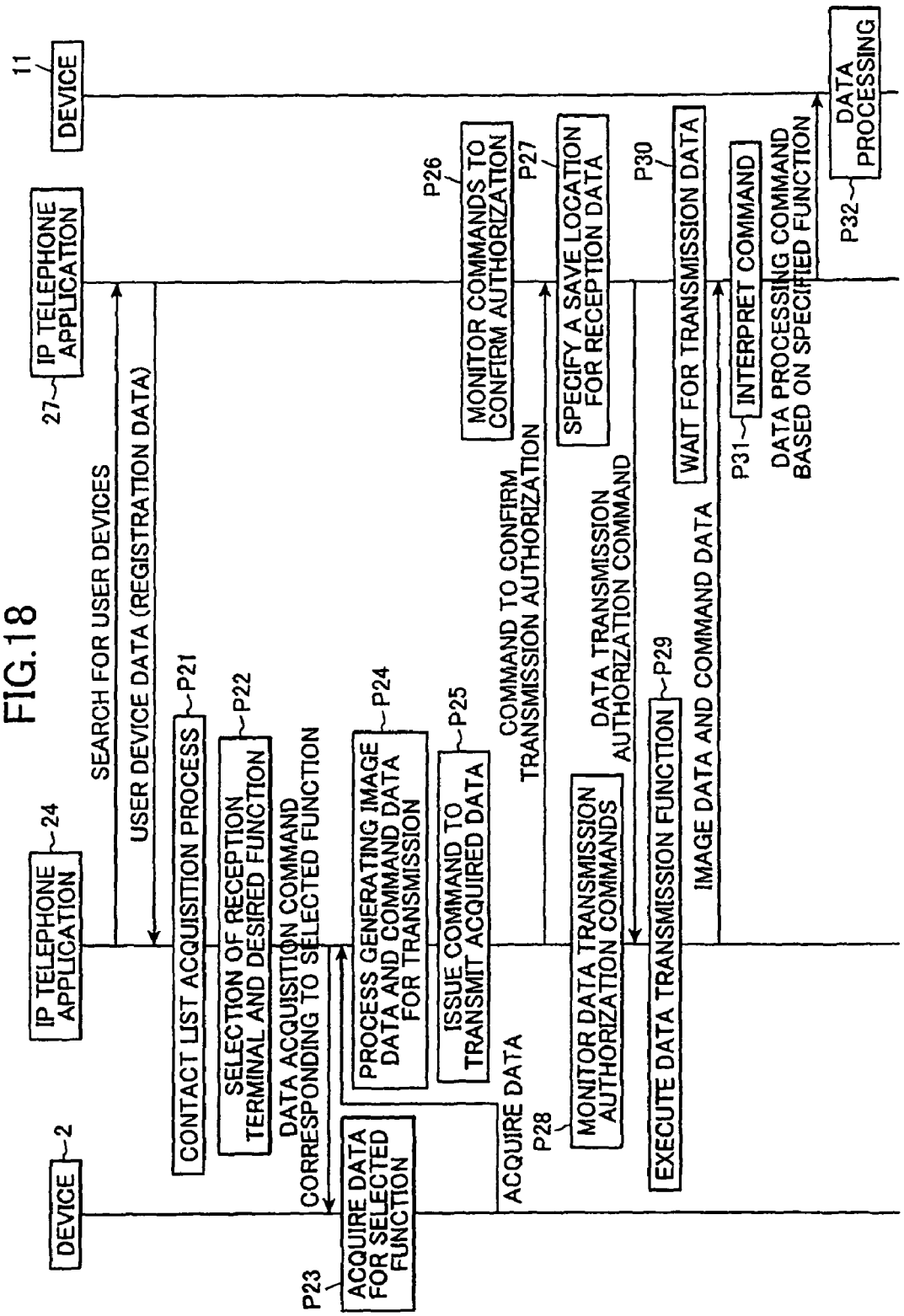

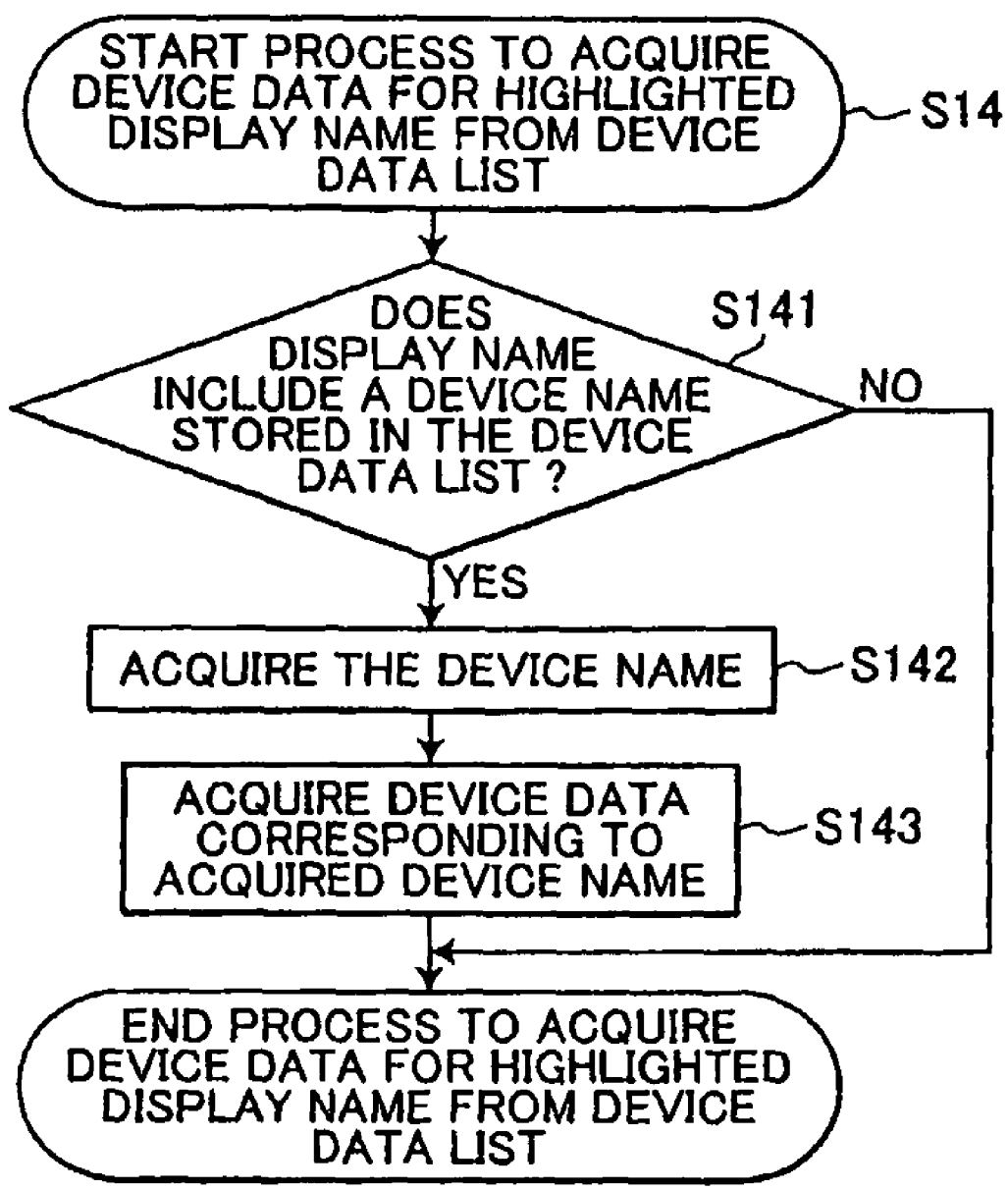

US 8,233,473 B2

IP TELEPHONE SYSTEM AND COMPUTER READABLE STORAGE MEDIUM

CROSS REFERENCE TO RELATED APPLICATIONS

This application claims priority from Japanese Patent Application Nos. 2007-260217 filed Oct. 3, 2007 and 2008-094055 filed Mar. 31, 2008. The entire content of each of these priority applications is incorporated herein by reference.

TECHNICAL FIELD

The present invention relates to an IP telephone terminal, an IP telephone program, an IP telephone collaborative program, an IP telephone system, a computer readable storage medium.

BACKGROUND

Internet Protocol (IP) telephone systems such as Skype have become commonplace in recent years. The IP telephone system can be used simply by installing an IP telephone application on a personal computer or other network terminal, where the IP telephone application is software developed by the IP telephone provider for originating and receiving calls and implementing voice communications. Skype, which offers a free IP telephone application and free calls, has particularly enjoyed much popularity. One factor enabling Skype to offer free calls may be its peer-to-peer communications, which eliminate the need for a server.

Japanese unexamined patent application publications Nos. 2005-192086 and 2005-080025 disclose related technologies for IP telephones.

However, IP telephone systems such as Skype cannot recognize data for another IP telephone terminal when communicating with the other terminal via an IP telephone call. Hence, even when the other caller is using an IP telephone terminal equipped with functions other than a telephone function, the user of the IP telephone terminal cannot take advantage of these functions. In other words, the resources of the IP telephone system are not effectively utilized and, therefore, are wasted.

The "Problems to Be Solved by the Invention" section of Japanese unexamined patent application publication No. 2005-192086 describes a convenient communication system in which a communication apparatus can execute a function not supported by the communication apparatus itself but possessed by another device. However, there is no description of a structure that can resolve the above problem, that is, how to recognize data for the other device and the functions possessed thereby.

Specifically, Japanese unexamined patent application publication No. 2005-192086 describes an IP telephone system having a server that registers information on network terminals. With this system, each transceiver terminal is provided with a function for referencing the information registered on the server. Therefore, the user can acquire information on other terminals and can transmit data that the other terminals can process.

This technology may be incorporated in an IP telephone system such as Skype by introducing a server into the system in order to register information on external terminals. The server could be referenced to acquire information on the external terminals. However, connecting to a server makes the system more complex and expensive, which would have a great impact on a system such as Skype that charges little or no usage fees.

The description in "0019" of Japanese unexamined patent application publication No. 2005-080025 asserts that a transmitting device transmitting images and a receiving device receiving the images can identify which communication method is supported by both parties using SDP media stream descriptions expanded by an SIP message, but this technology does not sufficiently resolve the problem described above.

SUMMARY

In view of the foregoing, it is an object of the present invention to provide an IP telephone terminal, IP telephone program, and IP telephone system capable of effectively utilizing rather than wasting the resources of the IP telephone system by facilitating an IP telephone terminal in utilizing the functions on another IP telephone terminal during IP telephone communications on an IP telephone system such as Skype.

It is another object of the present invention to provide an IP telephone collaborative program, IP telephone system, and method of controlling an IP telephone system capable of recognizing terminal data on a network terminal itself or on a telephone terminal connected to the network terminal without use of a server, even on an IP telephone system such as Skype.

In order to attain the above and other objects, the invention provides an IP telephone terminal. An IP telephone terminal includes an identification data receiving unit, a communicating unit, an IP telephone function controlling unit, a determining unit, a terminal data acquiring unit, and a terminal data acquiring unit. The identification data receiving unit receives, over an Internet, identification data identifying another IP telephone terminal. The communicating unit establishes IP telephone communications with the other IP telephone terminal identified by the identification data via the Internet. The IP telephone function controlling unit controls execution of an IP telephone function used to implement a telephone call with the another IP telephone terminal via the communicating unit. The determining unit determines the identification data received by the identification data receiving unit. The terminal data acquiring unit acquires terminal data associated with the identification data transmitted from the other IP telephone terminal over the Internet, in case the determining unit determines that the terminal data identifying functions that the other IP telephone terminal can control is associated with the identification data received by the identification data receiving unit. The process data transmission controlling unit controls transmission of a process data to the other IP telephone terminal via the IP telephone communications, where the process data is data used in the function identified by the terminal data acquired by the terminal data acquiring unit.

According to another aspect, the present invention provides a computer readable storage medium. The computer readable storage medium stores a computer-executable program for controlling a computer operable to control an IP telephone terminal. The IP telephone terminal includes an identification data receiving unit, a communicating unit, an IP telephone function controlling unit. The identification data receiving unit receives over an Internet identification data identifying another IP telephone terminal. The communicating unit establishes IP telephone communications with the other IP telephone terminal identified by the identification data via the Internet. The IP telephone function controlling unit controls execution of an IP telephone function used to implement a telephone call with the other IP telephone terminal via the communicating unit. The program includes instructions for functioning the computer as a determining unit, a terminal data acquiring unit, and a process data transmission controlling unit. The determining unit determines identification data received by the identification data receiving unit. The terminal data acquiring unit acquires terminal data associated with the identification data transmitted from the other IP telephone terminal over the Internet, in case the determining unit determines that the terminal data identifying functions that the other IP telephone terminal can control is associated with the identification data received by the identification data receiving unit. The process data transmission controlling unit that controls the transmission of process data to the other IP telephone terminal via the IP telephone communications, where the process data is data used in the function identified by the terminal data acquired by the terminal data acquiring unit.

According to still another aspect, the present invention provides a computer readable storage medium. The computer readable storage medium stores a computer-executable program for controlling a computer operable to control an IP telephone terminal. The IP telephone terminal includes a communicating unit, an identification data receiving unit, and IP telephone function controlling unit. The communicating unit establishes IP telephone communications over an Internet with another IP telephone terminal possessing identification data receiving unit that receives over the Internet identification data set for each IP telephone terminal. The IP telephone function controlling unit controls the execution of an IP telephone function used to implement a telephone call with the other IP telephone terminal through the communicating unit. The program includes instructions for functioning the computer as a function recognizing unit that recognizes functions that can be controlled by its own IP telephone terminal, and a registering unit that registers terminal data identifying the function recognized by the function recognizing unit as data that the other IP telephone terminal can receive through the identification data receiving unit.

According to still another aspect, the present invention provides an IP telephone system. The IP telephone system includes another IP telephone terminal and own IP telephone terminal. The another IP telephone terminal is on a network. The own IP telephone terminal includes an identification data receiving unit, a communicating unit, an IP telephone function controlling unit, a determining unit, a terminal data acquiring unit, and a process data transmission controlling unit. The identification data receiving unit receives, over an Internet, identification data identifying the other IP telephone terminal. The communicating unit establishes IP telephone communications with the other IP telephone terminal identified by the identification data via the Internet. The IP telephone function controlling unit controls execution of an IP telephone function used to implement a telephone call with the other IP telephone terminal via the communicating unit. The determining unit determines the identification data received by the identification data receiving unit. The terminal data acquiring unit acquires terminal data associated with the identification data transmitted from the other IP telephone terminal over the Internet, in case the determining unit determines that the terminal data identifying functions that the other IP telephone terminal can control is associated with the identification data received by the identification data receiving unit. The process data transmission controlling unit controls transmission of process data to the other IP telephone terminal via the IP telephone communications, where the process data is data used in the function identified by the terminal data acquired by the terminal data acquiring unit. The another IP telephone terminal includes a function recognizing unit and a registering unit. The function recognizing unit recognizes functions that can be controlled by the another IP telephone terminal. The registering unit registers terminal data identifying functions recognized by the function recognizing unit as data that the own IP telephone terminal can receive through the identification data receiving unit.

According to still another aspect, the present invention provides a computer readable storage medium. The computer readable storage medium stores a computer-executable IP telephone cooperative program for controlling a computer operable to control a network terminal which installs an IP telephone application program functioning the network terminal as an identification data receiving unit, a communicating unit, and an IP telephone function controlling unit. The identification data receiving unit receives over an Internet identification data identifying another IP telephone terminal. The communicating unit establishes IP telephone communications with the other IP telephone terminal identified by the identification data via the Internet. The IP telephone function controlling unit controls execution of an IP telephone function used to implement a telephone call with the other IP telephone terminal via the communicating unit. The IP telephone cooperative program includes instructions for functioning the computer as a determining unit that determines identification data received by the identification data receiving unit, a terminal data acquiring unit that acquires terminal data associated with the identification data transmitted from the other IP telephone terminal over the Internet, in case the determining unit determines that the terminal data identifying functions that the other IP telephone terminal can control is associated with the identification data received by the identification data receiving unit, and a process data transmission controlling unit that controls the transmission of process data to the other IP telephone terminal via the IP telephone communications performed by the communicating unit, where the process data is data used in the function identified by the terminal data acquired by the terminal data acquiring unit.

According to still another aspect, the present invention provides a computer readable storage medium. The computer readable storage medium stores a computer-executable IP telephone cooperative program for controlling a computer operable to control an IP telephone terminal functioning the network terminal as an identification data receiving unit, a communicating unit, and an IP telephone function controlling unit. The identification data receiving unit receives over an Internet identification data identifying another IP telephone terminal. The communicating unit establishes IP telephone communications with the other IP telephone terminal identified by the identification data via the Internet. The IP telephone function controlling unit controls execution of an IP telephone function used to implement a telephone call with the other IP telephone terminal via the communicating unit. The IP telephone cooperative program includes instructions for functioning the computer as a function recognizing unit and a registering unit. The function recognizing unit recognizes functions that can be controlled by its own IP telephone terminal. The registering unit registers, into the IP telephone application program, terminal data identifying the function recognized by the function recognizing unit as data that the other IP telephone terminal can receive through the identification data receiving unit.

According to still another aspect, the present invention provides an IP telephone system. The IP telephone system includes a plurality of IP telephone terminals. A plurality of IP telephone terminals includes an own IP telephone terminal and other IP telephone terminal. The own IP telephone terminal performs IP telephone call with the other IP telephone terminal with a communication unit and own IP telephone application program installed in the own IP telephone terminal, the communicating unit establishing IP telephone communications over an Internet with other IP telephone terminal possessing identification data receiving unit. The identification data receiving unit receives over the Internet identification data identifying each IP telephone terminal. The IP telephone application program receiving the identification data identifying each of the IP telephone terminal over the Internet and being configured to control the execution of an IP telephone function used to implement the telephone call with the other IP telephone terminal through the communicating unit. It is preferable that the own IP telephone terminal includes a determining unit, a terminal data acquiring unit, and a process data transmission controlling unit. The determining unit determines the identification data received by the identification data receiving unit, a process data transmission controlling unit. The terminal data acquiring unit acquires terminal data associated with the identification data transmitted from the other IP telephone terminal over the Internet, in case the determining unit determines that the terminal data identifying functions that the other IP telephone terminal can control is associated with the identification data received by the identification data receiving unit. The process data transmission controlling unit controls transmission of process data to the other IP telephone terminal via the IP telephone communications performed by the communicating unit provided in the own IP telephone terminal, where the process data is data used in the function identified by the terminal data acquired by the terminal data acquiring unit. The other IP telephone terminal includes a function recognizing unit and a registering unit. The function recognizing unit recognizes functions that can be controlled by the other IP telephone terminal. The registering unit registers, into an IP telephone application program installed in the other IP telephone terminal, terminal data identifying functions recognized by the function recognizing unit as data that the own IP telephone application program can receive.

According to still another aspect, the present invention provides a method of controlling an IP telephone system. The method of controlling an IP telephone system implements an IP telephone call between an own network terminal and another network terminal on a network or another telephone terminal connected to the other network terminal via an own IP telephone application installed on the own network terminal, the IP telephone call being performed with a communication unit and own IP telephone application program. The communicating unit establishing IP telephone communications over an Internet with the other network terminal or the other telephone terminal connected to the other network terminal possessing identification data receiving unit that receives over the Internet identification data identifying each the network terminal, and the IP telephone application program receiving the identification data identifying each of the IP telephone terminal over the Internet and being configured to control the execution of an IP telephone function used to implement the telephone call with the other network terminal or the other telephone terminal connected to the other network terminal through the communicating unit. It is preferable that in the own network terminal, the method includes determining the identification data received by the identification data receiving unit, acquiring terminal data associated with the identification data and transmitted from the other IP telephone terminal over the Internet upon determining that terminal data identifying functions that the other network terminal or the other telephone terminal connected to the other network terminal can control is associated with the identification data, and controlling transmission of process data to the other network terminal or the other telephone terminal connected to the other network terminal via the IP telephone communications performed by the communicating unit provided in the own network terminal, where the process data is data used in the function identified by the terminal data acquired by the terminal data acquiring unit. It is preferable that in the other network terminal or the other telephone terminal connected to the other network terminal, the method includes the steps of recognizing functions that can be controlled by the other network terminal or the other telephone terminal connected to the other network terminal, and registering, into an IP telephone application program installed in the other network terminal or the other telephone terminal connected to the other network terminal, terminal data identifying the recognized functions as data that the own IF application program can receive.

BRIEF DESCRIPTION OF THE DRAWINGS

The particular features and advantages of the invention as well as other objects will become apparent from the following description taken in connection with the accompanying drawings, in which:

FIG. 6 is a flowchart illustrating steps in a device data display process for a highlighted user device;

FIG. 7 is a screenshot showing an example of a user interface for a user device search;

FIG. 8 is a flowchart illustrating steps in a contact list acquisition process;

FIG. 9 is a flowchart illustrating steps in a user device search process for searching for user devices that support the IP telephone application;

FIG. 10 is a flowchart illustrating steps in a user device search results acquisition process for acquiring results from the IP telephone application;

FIG. 11 is a flowchart illustrating steps in a user device search process according to the intermediary application;

FIG. 12 is a screenshot illustrating an example of a user interface for functions using the user device;

FIG. 14 is a flowchart illustrating steps in a process for generating image data and command data to be transmitted;

FIG. 15 is a screenshot showing an example of a user interface for a firmware transmission program;

FIG. 16 is a block diagram showing the structure of an IP telephone system according to a second embodiment of the present invention;

FIG. 17 is a block diagram showing the electrical structure of the IP telephone system;

FIG. 18 is a sequence chart showing the sequence of steps in a program executed on the IP telephone system of the second embodiment;

FIG. 20 is a flowchart illustrating detailed steps in the process of S14 shown in FIG. 6.

DETAILED DESCRIPTION

First Embodiment

Next, a first embodiment of an IP telephone terminal, IP telephone program, IP telephone collaborative program, IP telephone system, and method of controlling an IP telephone system according to the present invention will be described while referring to FIGS. 1 through 15.

Figure 1:
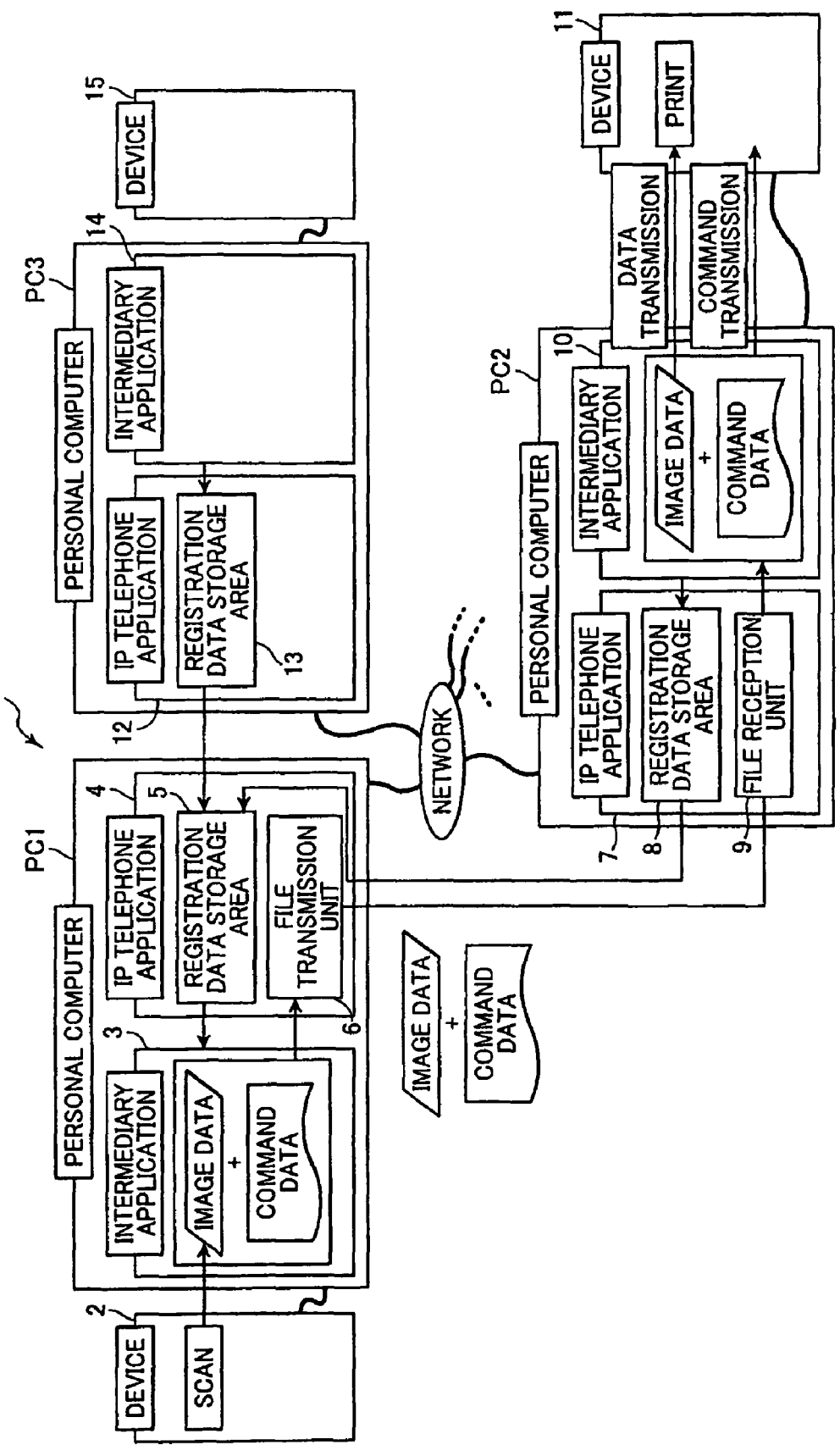
FIG. 1 is a block diagram showing the structure of an IP telephone system according to a first embodiment of the present invention.

FIG. 1 is a block diagram showing the structure of an IP telephone system 1 according to a first embodiment of the present invention.

The IP telephone system 1 in FIG. 1 includes a personal computer PC1, a device 2 connected to the personal computer PC1, a personal computer PC2, a device 11 connected to the personal computer PC2, a personal computer PC3, a device 15 connected to the personal computer PC3, and a plurality of personal computers (not shown) connected to a network.

FIG. 1 illustrates an example in which the device 2 connected to the personal computer PC1 scans an image, and the device 11 connected to the personal computer PC2 prints the scanned image.

An IP telephone application 4 and an intermediary application 3 are installed on the personal computer PC1. An IP telephone application 7 and an intermediary application 10 are installed on the personal computer PC2. An IP telephone application 12 and an intermediary application 14 are installed on the personal computer PC3. Here, the IP telephone application installed on each personal computer is communication software such as Skype capable of implementing telephone calls between personal computers via the network.

On the personal computer PC2, the intermediary application 10 registers registration data on the device 11 in a registration data storage area 8 of the IP telephone application 7. The registration data recorded in the registration data storage area 8 includes function identification data for functions possessed by the device 11. More specifically, if the device 11 possesses a print function, a scan function, and a save function for saving data on a media card, data indicating that the device 11 can implement these functions is recorded in the registration data storage area 8.

Next, a process performed when executing the intermediary application 10 for recording data including the function identification data in the registration data storage area 8 of the device 2 will be described. This process is executed prior to performing a series of IP telephone processes via the network.

Figure 2:
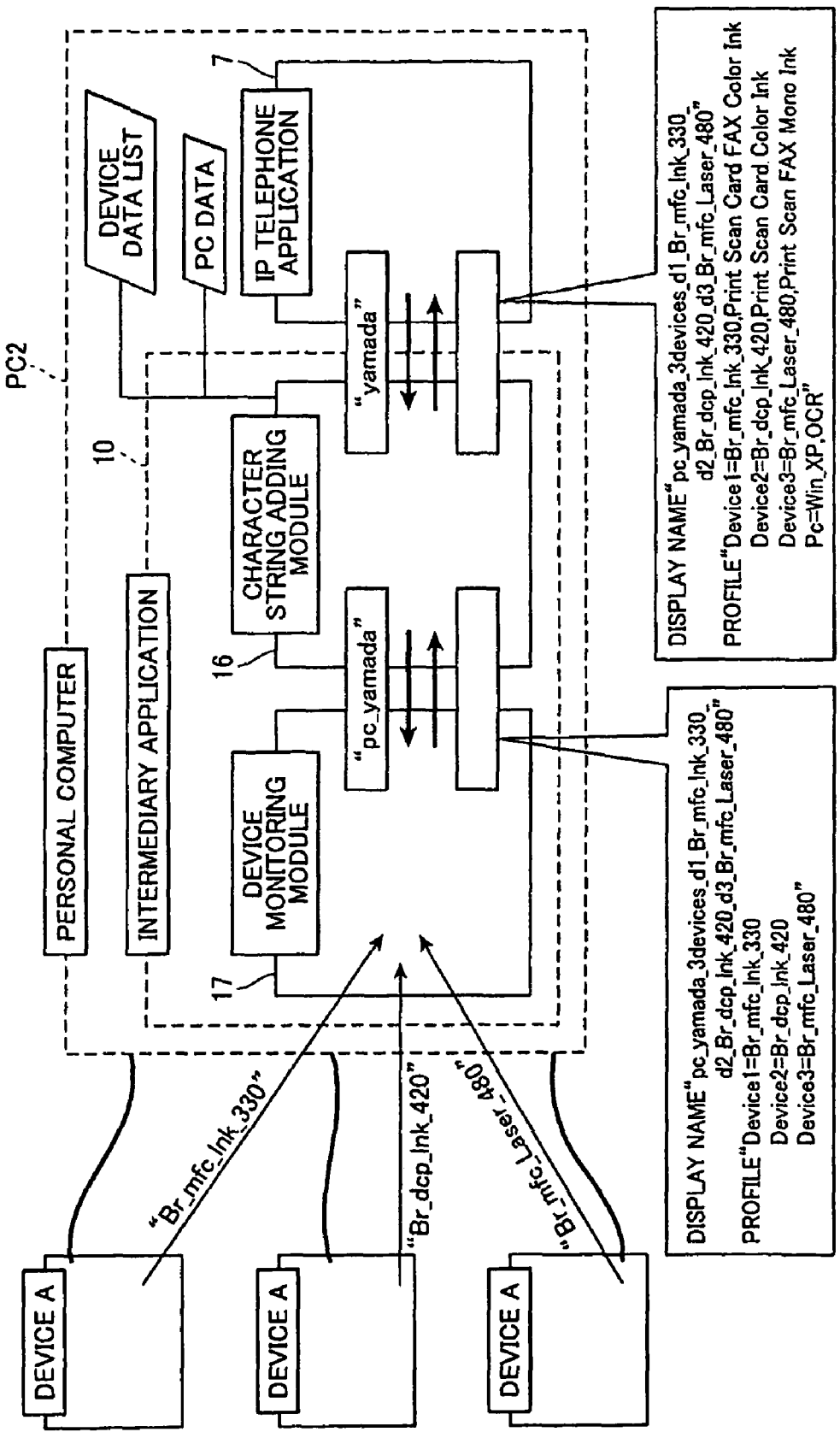
FIG. 2 is a block diagram showing the structure of a personal computer on which are installed an IP telephone application, an intermediary application, and a character string adding module and device monitoring module included in the intermediary application.

FIG. 2 is a block diagram showing the structure of the personal computer PC2. As shown in FIG. 2, the personal computer PC2 includes the IP telephone application 7, the intermediary application 10, a character string adding module 16 and a device monitoring module 17 included in the intermediary application 10, a device data list, and PC data.

When the intermediary application 10 is started, the character string adding module 16 acquires the display name "yamada" from the IP telephone application 7, acquires the PC name "pc" from the PC data for the personal computer PC2, generates the character string "pc_yamada," and transmits this character string to the device monitoring module 17. In order to handle changes in the PC name or display name, this process may also be performed periodically or whenever a name is changed.

The device monitoring module 17 stores the character string received from the character string adding module 16 each time a character string is transmitted.

As will be described later, the device monitoring module 17 monitors devices connected to the personal computer PC2 to determine whether the device environment of the personal computer PC2 has been updated and whether the devices connected to the personal computer PC2 support an IP telephone. Based on the monitoring results, the device monitoring module 17 generates a display name and profile for each monitored device and transmits this data to the character string adding module 16.

In the example of FIG. 2, devices A, B, and C transmit their respective device names "Br_mfc_Ink_330," "Br_dcp_Ink_420," and "Br_mfc_laser_480" to the device monitoring module 17.

The device monitoring module 17 recognizes that the three devices support IP telephone communications and transmits the display names "pc_yamada_3devices_d1_Br_mfc_Ink_330_d2_Br_dcp_Ink_420_d3_B r_mfc_laser_480" to the character string adding module 16. In this display name, "pc_yamada_3devices" indicates that three devices connected to pc_yamada have been detected. Further, the string "dn_" (where n=1-3) is inserted before each device name.

Since each device name is also recorded as a profile, as will be described below, it is possible to omit the character string indicating the device name from the display name.

Further, the device monitoring module 17 transmits the profile "Device1=Br_mfc_Ink_330 Device2=Br_dcp_Ink_420 Device3=Br_mfc_laser_480" to the character string adding module 16.

The character string adding module 16 references the device data list and acquires functions possessed by the device corresponding to each device name received from the device monitoring module 17 and appends a character string indicating the acquired functions for each device to the corresponding profile received from the device monitoring module 17.

The device data list includes data specifying the functions supported by each type of device.

The character string adding module 16 also references the PC data to acquire functions possessed by the personal computer PC2, and appends a character string indicating these acquired functions to the profile. Here, "PC data" is a collective designation for data stored in the registry and ini files and the like on the personal computer PC2 and includes the OS version on the personal computer PC2 and data for installed applications. The functions possessed by the personal computer PC2 can be identified from the OS version, types of installed applications, and the like.

Specifically, the character string adding module 16 sets the profile to
"Device1=Br_mfc_Ink_330, Print Scan Card FAX Color Ink
Device2=Br_dcp_Ink_420, Print Scan Card Color Ink
Device3=Br_mfc_laser_480, Print Scan FAX
Mono Laser
Pc=Win_XP, OCR." In the profile, "Print" indicates a print function, "Scan" indicates a scan function, "FAX" indicates a facsimile function, "Color" and "Mono" indicates color printing and monochromatic printing functions, "Ink" and "Laser" indicates an inkjet system and laser system, "Win_XP" indicates that the OS on the personal computer is Windows (registered trademark) XP, and "OCR" indicates an optical character recognition function. The character string adding module 16 also uses the same display name generated by the device monitoring module 17, that is, "pc_yamada_3devices_d1_Br_mfc_Ink_330_d2_Br_dcp_Ink_420_d3_B r_mfc_laser_480."

The display names and profiles are recorded in the IP telephone application 7.

Figure 3:
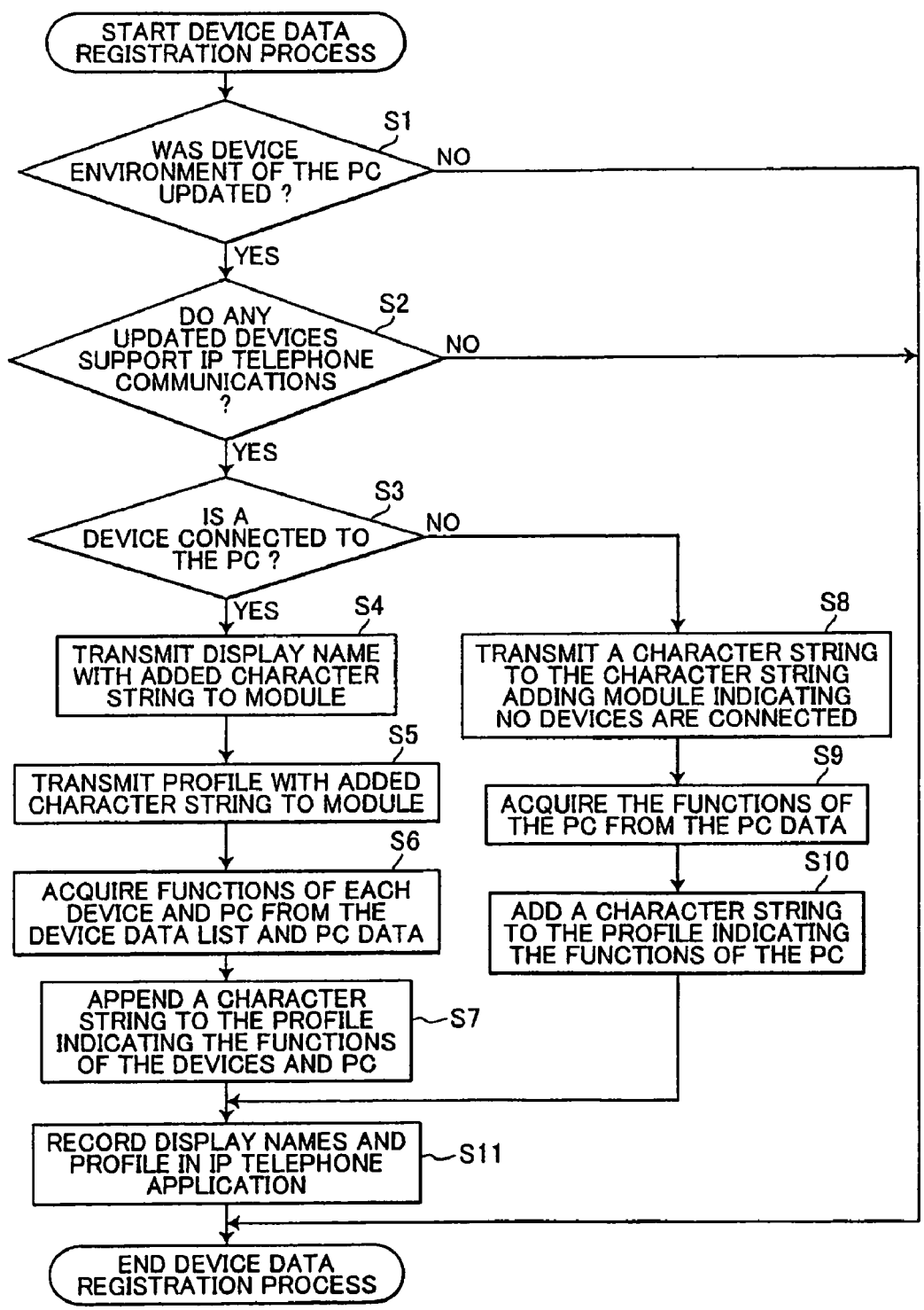
FIG. 3 is a flowchart illustrating steps in a device data registration process.

Next, the above process for registering device data will be described with reference to FIG. 3. FIG. 3 is a flowchart illustrating steps in this process. In the flowchart of FIG. 3, the processes in S1-S5 and S8 are performed with the device monitoring module 17, while the processes in S6, S7, and S9-S11 are performed with the character string adding module 16.

In S1 of FIG. 3, the device monitoring module 17 determines whether the device environment of the personal computer PC2 has changed. The device monitoring module 17 advances to S2 if the environment has been updated (S1: YES) and ends the device data registration process if the environment has not changed (S1: NO). If the process is being performed immediately after starting the personal computer PC2, the device monitoring module 17 determines that the device environment has changed and advances to S2.

In S2 the device monitoring module 17 determines whether or not a device supporting IP telephone communications exists among the updated devices. The device monitoring module 17 advances to S3 if one of the updated devices support an IP telephone device (S2: YES), or ends the device data registration process if an IP telephone device was not involved in the update. When the process is being performed immediately after the personal computer PC2 was started, the device monitoring module 17 determines that an IP telephone device is included in the updated devices and advances to S3.

In S3 the device monitoring module 17 determines whether a device is connected to the personal computer PC2. The device monitoring module 17 advances to S4 when a device is connected (S3: YES), and advances to SB when a device is not connected (S3: NO).

In S4 the device monitoring module 17 adds a character string indicating a connection number of the device to each device name, adds the string "_dn_" (where n is a number between 1 and the number of connected devices) to the head of each device name, and transmits a character string formed by concatenating each device name as the display name to the character string adding module 16. Subsequently, the device monitoring module 17 advances to S5.

In S5 the device monitoring module 17 acquires a device data character string from each device, forms a new character string by adding "devicen=" (where n is a number between 1 and the number of connected devices) to the head of this character string, and transmits the new character string to the character string adding module 16 as the profile. Subsequently, the process continues from S6.

In S6 the character string adding module 16 acquires a character string indicating the functions of each device transmitted in the profile and the personal computer PC2 from the device data list and the PC data, and subsequently advances to S7.

In S7 the character string adding module 16 appends a character string indicating the functions of acquired devices and the personal computer PC2 to each device data in the profile, and subsequently advances to S11.

In S8 the device monitoring module 17 transmits a character string to the character string adding module 16 as the display name indicating that no devices are connected, and subsequently the process advances to S9.

In S9 the character string adding module 16 acquires the functions of the personal computer PC2 from the PC data and subsequently advances to S10.

In S10 the character string adding module 16 adds a character string indicating the functions of the personal computer PC2 to the profile, and subsequently advances to S11.

In S11 the character string adding module 16 records the display names and the profile in the IP telephone application 7.

The intermediary application 10 according to the preferred embodiment recognizes functions possessed by the personal computer PC2 or devices connected to the personal computer PC2. The recognized functions are recorded in the IP telephone application 7 as function identification data that can be acquired by other IP telephone applications. The function identification data constitutes at least part of the registration data recorded in the IP telephone application 7 and can be supplied to other personal computers that implement IP telephone communications via another IP telephone application.

On the personal computer PC3, the intermediary application 14 records registration data including function identification data for functions possessed by the device 15 in a registration data storage area 13 of the IP telephone application 12. This registration is performed through manual input by the user of the personal computer PC3 and the like. The intermediary application 3 of the personal computer PC1 also has a similar function to the intermediary application 10 for recording registration data including function identification data for functions possessed by the device 2 in a registration data storage area (not shown) of the IP telephone application 4.

In FIG. 1, a plurality of personal computers (not shown) other than the personal computers PC1-PC3 are connected to the network. As with the personal computers PC1-PC3, an IP telephone application and an intermediary application are installed on each of these personal computers, and devices are connected to the computers. Accordingly, registration data including function identification data for functions possessed by each device is recorded in a registration data storage area of the corresponding IP telephone application.

In other words, registration data including function identification data identifying functions possessed by each device is recorded in the registration data storage area of each corresponding IP telephone application installed on the personal computers PC1-PC3 and the other personal computers.

The registration data stored in the registration data storage area 8, the registration data storage area 13, and the registration storage area of each IP telephone application installed on the plurality of other personal computers is transferred over the network to the IP telephone application 4 in the personal computer PC1. This registration data is then stored in a registration data storage area 5 of the IP telephone application 4.

Figure 4:
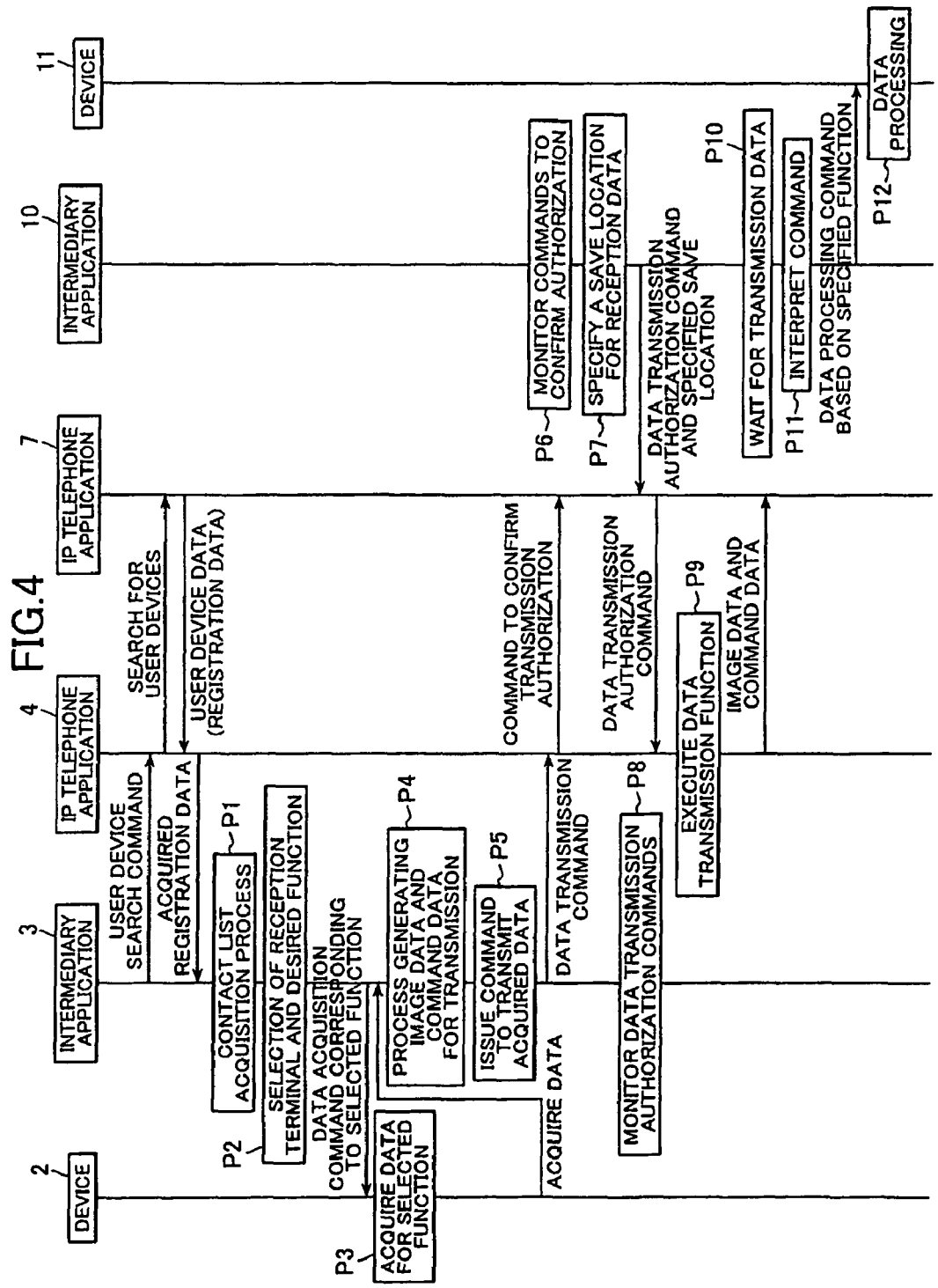
FIG. 4 is a sequence chart showing the sequence of steps in a program executed on the IP telephone system of the first embodiment.

Next, steps in a procedure will be described, using the example of data acquired from the device 2 connected to the personal computer PC1 being subsequently processed by the device 11 connected to the personal computer PC2. FIG. 4 shows the sequence of steps performed according to an IP telephone program of the preferred embodiment.

First, the intermediary application 3 issues a search command to the IP telephone application 4 to search for user devices. The IP telephone application 4 searches for user devices on IP telephone applications (the IP telephone application 7 and the like) installed on other personal computers. At this time, the IP telephone application 7 and the like transmit user device data (registration data) to the IP telephone application 4, and the IP telephone application 4 stores this registration data in the registration data storage area 5.

In P1 the intermediary application 3 performs a process to acquire a contact list based on the registration data received from the other personal computers and stored in the registration data storage area 5. This process will be described later in greater detail, but the process allows the intermediary application 3 to acquire a contact list of user devices registered in the IP telephone applications. The contact list is a list of user devices representing candidates that can be called from the IP telephone application 4. Hence, the IP telephone application 4 stores registration data acquired from IP telephone applications installed on the other personal computers though not shown in the drawings, the IP telephone applications 7 and 12 are also provided with a contact list. Further, the contact list can be edited outside the IP telephone application.

In P2 the intermediary application 3 selects the reception terminal and function to be used. While this process will be described later in greater detail, after the desired function is selected, the intermediary application 3 issues a data acquisition command corresponding to the selected function to the device 2 connected to the personal computer PC1.

In P3 the device 2 acquires data based on the selected function. For example, the device 2 transfers scanned image data to the intermediary application 3 of the personal computer PC1.

In P4 the intermediary application 3 generates image data and command data to be transferred. While this process will be described in greater detail below, the image data and command data to be transferred are generated based on the type of process to be performed on the destination device with the acquired data.

In P5 the intermediary application 3 issues a command to transmit the acquired data. The command for transmitting data acquired in P3 is issued to the IP telephone application 4. Next, the IP telephone application 4 of the personal computer PC1 issues a command to the IP telephone application 7 of the personal computer PC2 to confirm data transmission authorization.

In P6 the intermediary application 10 monitors received data for a command to confirm data transmission authorization. At this time, the intermediary application 10 detects such a command when the command is transferred from the IP telephone application 4 and received by the IP telephone application 7.

In P7 the intermediary application 10 performs a process to specify a location for saving reception data in response to a command transferred from the IP telephone application 4 to the IP telephone application 7 and subsequently issues a command to the IP telephone application 7 to authorize data transmission and transmits the location specification for saving reception data. The IP telephone application 7 issues a command to confirm data transmission authorization to the IP telephone application 4.

In P8 the intermediary application 3 monitors received data for a command to authorize data transmission and detects the data transmission authorization command when such a command is transferred from the IP telephone application 7 to the IP telephone application 4.

In P9 the IP telephone application 4 executes a data transmission function. Specifically, a file transmission unit 6 provided in the IP telephone application 4 attaches command data corresponding to the function provided on the device 11 to the data acquired in P3 and transmits this data to a file reception unit 9 provided in the IP telephone application 7.

In P10 the intermediary application 10 waits for the transmission data and subsequently receives the data transmitted in P9.

In P11 the intermediary application 10 interprets the command data within the data received from the IP telephone application 4, and outputs a data processing command for the selected function to the device 11 based on the interpreted command data.

In P12 the device 11 performs a data process using the specified function based on the data processing command.

Through the processes P1-P12 described above, data for the selected function is acquired from the device 2, and the device 11 performs a data process on the acquired data using the selected function.

The processes in P5-P10 constitute a process for transmitting image data and command data from the personal computer PC1 to the personal computer PC2.

The intermediary application 3 according to the preferred embodiment can select a function possessed by the personal computer PC2 to execute, acquire data in a format to be processed by the selected function, and direct the IP telephone application 4 to transmit this data. Accordingly, the intermediary application 3 can direct the personal computer PC2 to implement a prescribed function when the IP telephone application 4 installed on the personal computer PC1 only possesses a function to communicate with other personal computers.

Further, since the intermediary application 3 according to the preferred embodiment transmits data identifying a selected function in addition to data to be processed, the personal computer PC2 can process the data received from the intermediary application 3 using the specified function.

Next, this process will be described in greater detail. When the user of the personal computer PC1 inputs an instruction to the intermediary application 3 at a desired timing, the user interface of the intermediary application shown in FIG. 5 is launched.

Figure 5:
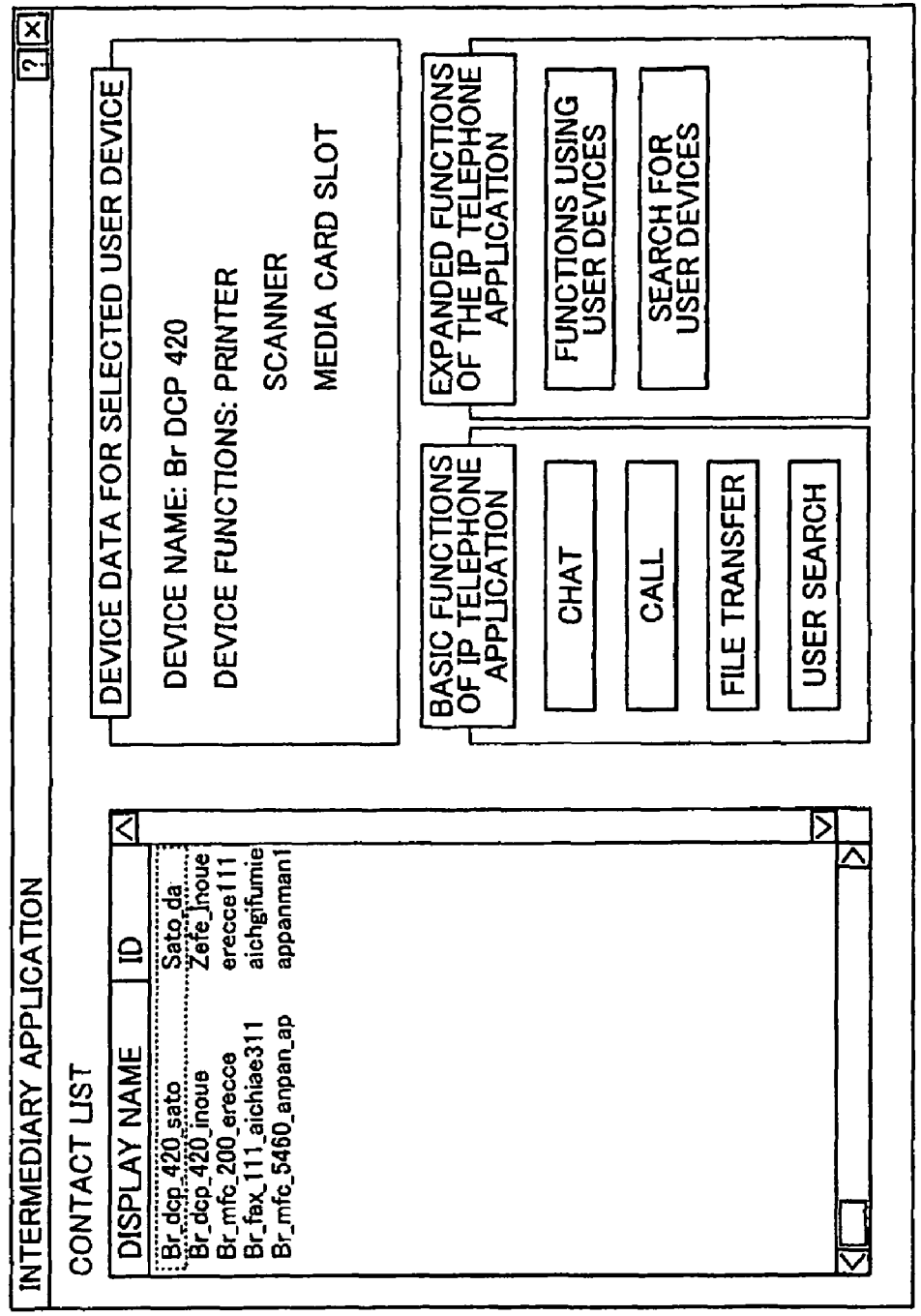
FIG. 5 is a screenshot showing an example of a user interface in the intermediary application.

The user interface shown in FIG. 5 functions to acquire data recorded in the processes of S1-S11 in an IP telephone application installed on another PC (the IP telephone application 7 for example) via the IP telephone application 4 installed on the personal computer PC1 and to use functions of the other PC and devices connected to the other PC. Hence, the user interface of the intermediary application 10 includes a "Search for User Devices . . . " button for displaying a user interface (see FIG. 7) to acquire data recorded on an IP telephone application installed on another PC, and a "Functions Using User Devices . . . " button for displaying a user interface (see FIG. 12) to use functions of the other PC and devices connected to the other PC.

A box labeled "Device Data for the Selected User Device" in the user interface displays function identification data corresponding to the display name selected in the "Contact List" (the display name highlighted in the contact list with a dotted line). In the example shown in FIG. 5, the device name "Br DCP 420" and the device functions "Printer, Scanner, and Media Card Slot" corresponding to the highlighted user device "Br_dcp_420_sato" are displayed as the device data.

The user can execute any of the basic functions possessed by the IP telephone application by pressing the corresponding button "Chat . . . ," "Call . . . ," "File Transfer . . . ," and "Search for User . . . " listed under "Basic Functions of the IP Telephone Application."

Further, pressing on one of the buttons "Functions Using User Devices . . . " and "Search for User Devices . . . " under "Expanded Functions of the IP Telephone Application"

launches the corresponding user interface for implementing functions using user devices and for searching for user devices.

FIG. 6 is a flowchart illustrating steps in a process for displaying device data related to the highlighted user device display name. This process is executed each time the highlighted display name in the user interface of FIG. 5 changes.

In S12 of FIG. 6 the intermediary application 3 acquires device data corresponding to the highlighted display name from the display name and profile.

In S13 the intermediary application 3 determines whether or not the device data was successfully acquired. The process skips to S15 when the device data was acquired successfully (S13: YES) and advances to S14 when unsuccessful (S13: NO).

In S14 the intermediary application 3 acquires data indicating the type of device specified in the highlighted display name and functions possessed by the device from the device data list.

In S15 the intermediary application 3 displays the device name and device functions acquired above in the "Device Data for the Selected User Device" box of the user interface shown in FIG. 5, and subsequently ends the process.

Here, examples have been given for a process to directly extract device data for the highlighted display name from the display name and profile or for indirectly extracting device data by referencing the device data list based on the highlighted display name.

In addition, it is possible to extract functions possessed by each device from the registration data for each device and configure the function identification data by individually appending these functions to the corresponding display name of the user device. For example, function identification data extracted from the registration data may be "deviceA_userB_printer," "deviceA_userB_scanner," "deviceA_userB_FAX," and "deviceA_card."

Next, the process for acquiring the contact list executed in P1 of FIG. 4 will be described.

FIG. 7 shows an example user interface for a user device search that is displayed when the user presses the "Search for User Devices..." button in the user interface of FIG. 5. Using this user interface, the user can acquire data registered in an IP telephone application installed on another PC. The user interface for user device searches includes a selector displayed under "1. Please Select the Search Criteria" ("Display name" is selected in this example); radio buttons provided next to "Search by Device Function" and "Search by Device Type" displayed beneath "2. Please Select the Function or Type of Device" ("Search by Device Function" has been selected in this example); a "Search" button displayed beneath "3. Please Press the Search Button"; a list of search results displayed beneath "User Device Search Results"; a "Insert Selected User Device into Contact List" that inserts the highlighted user device in the user device search results into the contact list when pressed; and a "Cancel" button that cancels the user device search when pressed.

The user first specifies criteria for searching for user devices from items in the registration data in the "1. Please Select the Search Criteria" and then specifies properties of user devices that the user wishes to acquire in a search within the "2. Please Select the Function or Type of Device." After the user presses the "Search" button, the process in S16 of FIG. 8 described later is executed to obtain the user device search results corresponding to the above specifications under "User Device Search Results."

FIG. 8 is a flowchart illustrating steps in the process for acquiring a contact list.

In S16 of FIG. 8 the intermediary application 3 performs a search for user devices supporting an IP telephone application. This process is executed when the user presses the "Search" button after specifying the function or type of device being searched in the user interface of FIG. 7. The intermediary application 3 acquires user device search results (registration data) from the IP telephone applications and retrieves and displays the functions or types of devices included in the search results.

In S17 the intermediary application 3 performs a process to add user devices supporting an IP telephone application from the search results to the contact list. More specifically, when the user presses the "Insert Selected User Device into Contact List" in the user interface of FIG. 7, the intermediary application 3 adds the highlighted user device in the user device search results to the contact list provided in the IP telephone application 4. Subsequently, the intermediary application 3 ends the contact list acquisition process.

Next, the process for searching for user devices supporting IP telephone applications will be described in detail. FIG. 9 is a flowchart illustrating steps in this search process performed in S16 of FIG. 8.

In S18 of FIG. 9, the intermediary application 3 stores data indicating the user's specification in "1. Please Select the Search Criteria" and "2. Please Select the Function or Type of Device" in the user interface of FIG. 7 in a variable DEV.

In S19 the intermediary application 3 performs a process to acquire user device search results from the IP telephone application from acquired registration data.

In S20 the intermediary application 3 performs a process to search user devices. Subsequently, the intermediate application 3 ends the process started in S16 of FIG. 8 to search for user devices supporting an IP telephone application.

FIG. 10 is a flowchart illustrating steps in the process for acquiring user device search results from an IP telephone application initiated in S19 of FIG. 9.

In S21 of FIG. 10, the intermediary application 3 transmits a user device search command to an Application Programming Interface (API) of the IP telephone application 4. In response, the IP telephone application 4 searches for user devices according to a procedure defined by IP telephone specifications to acquire registration data.

In S22 the intermediary application 3 acquires results of this user device search from the IP telephone application 4 via the API of the IP telephone application 4.

After completing S22, the intermediary application 3 ends the process to acquire user device search results from the IP telephone application.

FIG. 11 is a flowchart illustrating steps in a process to search for user devices performed in S20 of FIG. 9 by the intermediary application 3.

In S23 of FIG. 11 the intermediary application 3 acquires a character string from the device data list based on the variable DEV identifying devices targeted for a search. The device data list includes values indicating the functions or types of devices similar to the value stored in the variable DEV, and corresponding data in the form of a character string identifying devices having these functions or devices of these types.

In S24 the intermediary application 3 searches for the character string acquired in S23 from the user device search results received from the IP telephone application.

In S25 the intermediary application 3 determines whether or not there exist any user devices corresponding to the character string used in the search. The intermediary application 3 advances to S26 if such user devices exist (S25: YES) and advances to S28 if no such device exists (S25: NO).

In S26 the intermediary application 3 extracts all user devices matching the character string used in the search.

In S27 the intermediary application 3 displays all user devices extracted in S26 in a list under "Results of the user device search" in the user interface of FIG. 7. Subsequently, the intermediary application 3 ends the user device search process for user devices supporting an IP telephone application.

In S28 the intermediary application 3 displays a message indicating that the selected user device does not exist. For example, the intermediary application 3 outputs the message "The selected user device was not found. Either the user device does not exist or is not online." After the user presses "OK," the intermediary application 3 ends the user device search process for searching for user devices supporting an IP telephone application.

On the personal computer PC1 incorporating an IP telephone application, the intermediary application 3 according to the preferred embodiment can acquire function identification data identifying functions possessed by other personal computers or other devices, even in an IP telephone system that does not employ a server. The intermediary application 3 either directly extracts this data from registration data acquired by the IP telephone application 4 or indirectly acquires the data based on this registration data, which registration data is recorded in another IP telephone application installed on a network personal computer. Accordingly, the intermediary application 3 can identify functions possessed by other personal computers or other devices based on data recorded on the other IP telephone applications.

Further, with the intermediary application 3 according to the preferred embodiment, the user of the personal computer PC1 can visually identify a plurality of functions possessed by other personal computers or other telephone terminals.

Next, the process of selecting a reception terminal and a desired function in P2 of FIG. 4 will be described.

When the user presses the "Functions Using User Devices . . . " button at an arbitrary timing in the user interface of FIG. 5, the intermediary application 3 launches a user interface for functions using user devices shown in FIG. 12 and executes the process in P2 of FIG. 4, which will be described later with reference to FIG. 13.

The user interface for functions using user devices in FIG. 12 includes boxes for a "Contact List" and "Target User Devices," "Add" and "Delete" buttons for adding and deleting target users to and from the "Target User Devices," radio buttons for specifying target data in the contact list (for selecting either "Scanned Data" or "Existing Files" in the present example), radio buttons for specifying functions to be performed on target user devices (for selecting either "Print," "Save Image to Media Card," or "OCR" in the present example), an "OK" button for executing a function, and a "Cancel" button for canceling the function.

A target user device is a user device targeted for performing a process based on a selected function. A plurality of target user devices may be specified. To add a user device to the "Target User Devices" box, the user can highlight a user device in the contact list to add to the target user devices and press the "Add" button. Similarly, if the user wishes to delete a user device from the "Target User Devices" box, the user can highlight a user device to be deleted from the "Target User Devices" box and press the "Delete" button.

Once the user presses the "OK" button in the user interface of FIG. 12, the intermediary application 3 performs part of the process in P2 of FIG. 4 based on the selected function, and the device 2 executes the process in P3.

Figure 13:
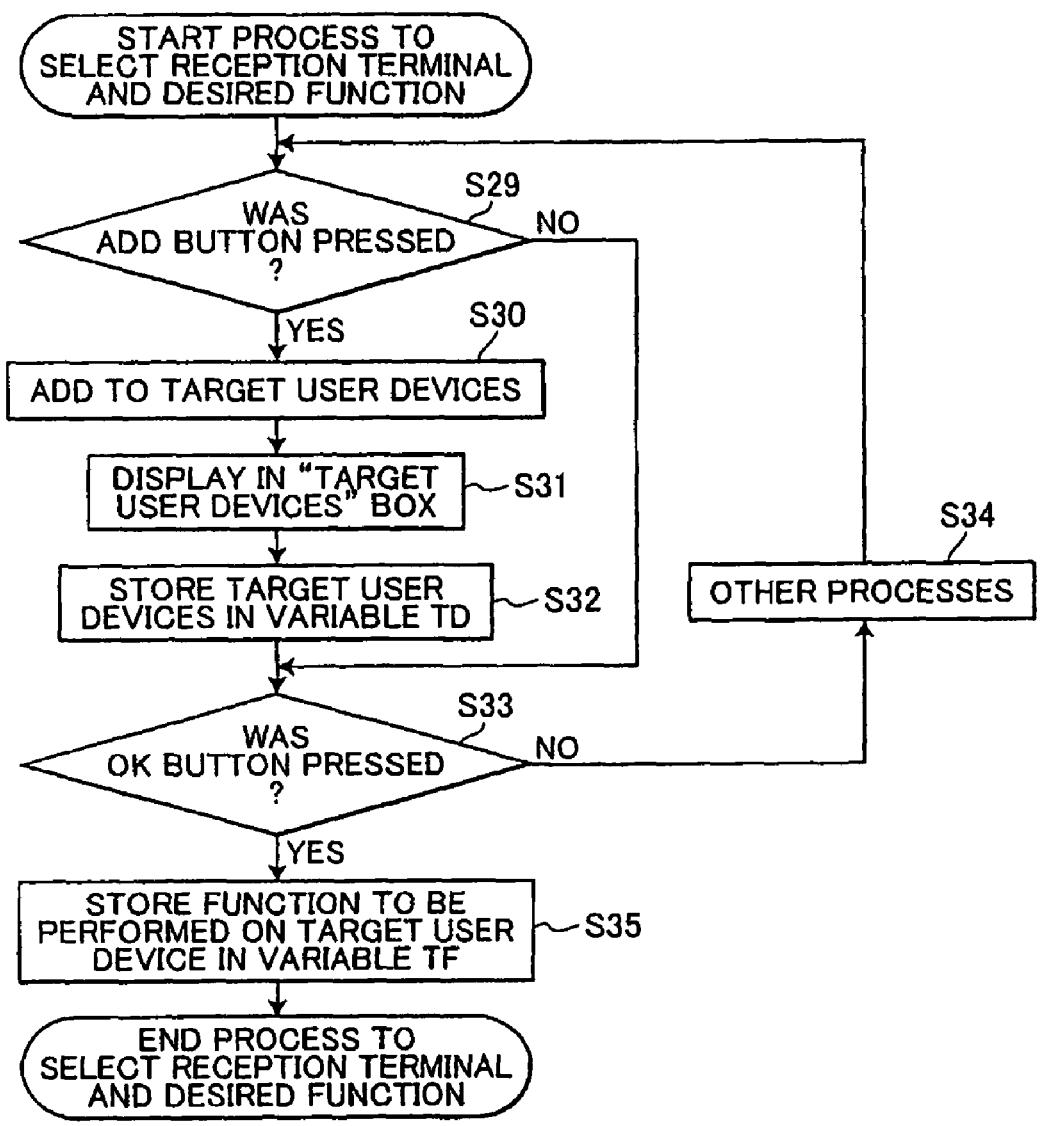
FIG. 13 is a flowchart illustrating steps in a process for selecting a reception terminal and a desired function.

FIG. 13 is a flowchart illustrating steps in the process for selecting a reception terminal and desired function executed when the user interface of FIG. 12 is displayed.

In S29 of FIG. 13, the intermediary application 3 determines whether or not the "Add" button was pressed. The intermediary application 3 advances to S30 if the "Add" button was pressed (S29: YES) and advances to S33 if not pressed (S29: NO).

In S30 the intermediary application 3 adds the user device highlighted in the contact list to the target user devices.

In S31 the intermediary application 3 displays the newly added user device in the "Target User Devices" box of the user interface.

In S32 the intermediary application 3 stores the target user devices in the variable TD.

In S33 the intermediary application 3 determines whether the "OK" button has been pressed. The intermediary application 3 advances to S35 if the "OK" button was pressed (S33: YES) and advances to S34 if not pressed (S33: NO).

In S34 the intermediary application 3 performs additional processes for such cases as when the user has selected the radio button next to "Existing Files" under "Target Data" in the user interface of FIG. 12 or when the user has pressed the "Cancel" button. If the user has selected the radio button next to "Existing Files," the intermediary application 3 performs a process to specify a file. Subsequently, the intermediary application 3 returns to S29.

When the user has pressed the "Cancel" button, the intermediary application 3 closes the UI window for functions using user device and cancels all subsequent steps of the process.

In S35 the intermediary application 3 stores the function to be performed by the target user device in the variable TF. Subsequently, the intermediary application 3 issues a data acquisition command based on the desired function (the function to be performed by the target user device) to the device 2, prompting the device 2 to execute the process of P3 in FIG. 4. At this point, the intermediary application 3 ends the process for selecting a reception terminal and desired function.

Once the device 2 has executed the process of P3 in FIG. 4 and the intermediary application 3 has received data from the device 2, the intermediary application 3 executes the process in P4 of FIG. 4 for generating image data and command data to be transmitted. This process will be described next in greater detail. FIG. 14 is a flowchart illustrating steps in the process for generating image data and command data to be transmitted.

In S36 of FIG. 14 the intermediary application 3 selects the function to be performed on the target user device based on the variable TF. The intermediary application 3 advances to S37 when the selected function is "Print," advances to S39 when the selected function is "Save to Media Card," and advances to S40 when the selected function is "OCR."

In S37 the intermediary application 3 converts acquired image data to print data. More specifically, the intermediary application 3 converts the image data to a format for printing on the target user device and attaches a code for print control.

In S38 the intermediary application 3 generates a print command file. Specifically, the intermediary application 3 stores print command data in the command data shown in FIG. 1. Subsequently, the intermediary application 3 ends the process to generate image data and command data to be transmitted.

In S39 the intermediary application 3 generates a command data for saving data on a media card. More specifically, the intermediary application 3 stores memory card save command data in the command data shown in FIG. 1. Subsequently, the intermediary application 3 ends the process to generate image data and command data to be transmitted.

In S40 the intermediary application 3 performs an image process to convert the acquired image data to OCR-supported data. More specifically, the intermediary application 3 sets a suitable threshold for OCR and performs binarization on the image data based on this threshold.

In S41 the intermediary application 3 creates OCR command data, and subsequently ends the process to generate image data and command data to be transmitted.

The process of S36-S41 described above is executed on all target devices stored in the array of variables TD.

Since the intermediary application 3 according to the preferred embodiment transmits data identifying a desired function to be used in processing data together with the data, the other personal computer or other telephone terminal can process received data using the specified function.

Further, the intermediary application 3 according to the preferred embodiment can acquire and display at least terminal function identification data identifying a plurality of other personal computers or a plurality of other devices. The user can select the display terminal function identification data for directing one of the other personal computers or devices to process the data.

Further, the intermediary application 3 according to the preferred embodiment can display function identification data related to other personal computers or other devices possessing the user-specified function.

Further, with the IP telephone system 1 and the method of controlling the IP telephone system 1 according to the preferred embodiment, the intermediary application 3 can identify functions possessed by other personal computers or other devices by directly or indirectly acquiring function identification data identifying these functions from registration data acquired by the IP telephone application 4, even when the IP telephone system does not employ a server. The registration data is data recorded in another IP telephone application installed on the other personal computer on the network.

In addition, functions possessed by another personal computer or another device are recorded in the corresponding other IP telephone application as function identification data that the IP telephone application 4 can acquire. This function identification data constitutes at least part of the registration data recorded in the other IP telephone application. The personal computer PC1 can acquire this function identification data when performing an IP telephone call via the IP telephone application 4.

The intermediary application 3 can implement a prescribed function on another personal computer or a device on the network, even when the IP telephone application 4 installed on the personal computer PC1 has only a function for communicating with a personal computer. Specifically, the intermediary application 3 can select a function possessed on the other personal computer or other device to be executed, acquire data in the format required for processing with the selected function, and direct the IP telephone application 4 to transmit this data.

when an IP telephone application including only a function for implementing communications between terminals is already installed on the own network terminal, resources of the IP telephone system can be effectively used without requiring a long processing time for replacing the IP telephone application, for example.

Further, since the intermediary application 3 transmits data identifying the function to be used for processing data together with the data to be processed in the IP telephone system 1 according to the preferred embodiment, the other personal computer or other device can process the received data using the specified function.

Data transmitted by one network terminal can be processed on another network terminal using a processing function selected by the network terminal that transmitted the data, thereby effectively utilizing resources of both the network terminal on the transmission side and the network terminal on the reception side.

Variations of the Embodiment

Next, a firmware transmission program according to a variation of the embodiment will be described. FIG. 15 shows an example of a user interface in the firmware transmission program.

The firmware transmission program is used for transmitting firmware for a prescribed device from the manufacturer that developed the device. In the present variation, firmware includes the firmware of the prescribed device itself, and an intermediary application operating between the device and the IP telephone application.

The user interface for the firmware transmission program shown in FIG. 15 includes a "Select User Data" selector, a "Device Type" selector, a "Device Model" list, a "Firmware Selection" input line, a "User Search Results" list, a "Device Data for Selected User" sub-window, a "Search" button, a "Transmit" button, and a "Cancel" button.

An administrator at the manufacturer for firmware support launches the user interface in FIG. 15 at a desired timing, selects criteria for the user device search from the registration data using the "1. Please Select the Search Criteria" selector ("Display name" is selected in this example), selects the type of device to search for with the "Device Type" selector ("Inkjet printer, multifunction device" is selected in this example), and selects the model of the device to search for from the "Device Model" list ("MFC-420CN" is selected in this example). The selectors have the same functions as those in FIG. 7. When the administrator subsequently presses the "Search" button, the intermediary application 3 executes the process described in FIG. 9 to search for user devices supporting an IP telephone application and displays display names and the like of user devices matching the searched device type in the "User Device Search Results" box.

Further, the process of FIG. 6 is executed when there is any change in the highlighted device of the search results to display the name of the highlighted user device and the functions possessed by the device. When the administrator inputs a filename for the firmware to be transmitted in the "Firmware Selection" input line and presses the "Transmit" button, the firmware specified by the filename is transmitted to the user devices displayed in the "User Device Search Results" box. Upon receiving this firmware, the user devices update their firmware.

In this way, the intermediary application 3 can update the firmware on network terminals or telephone terminals possessing an IP telephone application based on data recorded in their IP telephone applications. Sometimes a manufacturer creates and updates firmware for each function of a device. With the variation of the embodiment, the intermediary application 3 can verify functions possessed by user devices and transmit the correct firmware for updates.

Second Embodiment

Next, an IP telephone terminal, IP telephone program, and IP telephone system of the present invention will be described according to a second embodiment while referring to FIGS. 16-20.

FIG. 16 shows the structure of an IP telephone system 20 according to the second embodiment.

In the IP telephone system 20 of the second embodiment, like parts and components to those of the IP telephone system 1 in the first embodiment shown in FIG. 1 are designated with the same reference numerals to avoid duplicating description.

While the IP telephone application 4 and intermediary application 3 were installed on the personal computer PC1 in the first embodiment, an IP telephone application 24 is installed on the personal computer PC1 of the second embodiment. The IP telephone application 24 is a program capable of implementing the functions of both the IP telephone application 4 and the intermediary application 3 described in the first embodiment.

Similarly, an IP telephone application 27 is installed on the personal computer PC2 of the second embodiment, where the IP telephone application 27 is a program capable of implementing both the functions of both the IP telephone application 7 and intermediary application 10 described in the first embodiment.

While the IP telephone application 24 and IP telephone application 27 have the same operations and effects in the second embodiment, different reference numerals are used in the following description for convenience.

Further, the character string adding module 16 and device monitoring module 17 (see FIG. 2) are integrated in both the IP telephone applications 24 and 27 for implementing the device data registration process (see FIG. 3) on the personal computer PC1 and personal computer PC2. However, since the character string adding module 16 and the device monitoring module 17 and the device data registration process are identical to those described in the first embodiment, a description of these modules and process will not be repeated.

FIG. 17 is a block diagram showing the electrical structure of the IP telephone system 20 according to the second embodiment.

As shown in FIG. 17, the personal computer PC1 is provided with a CPU 31, a ROM 32, a RAM 33, and a hard disk drive (HDD) 34. The personal computer PC1 is also provided with an audio interface 37 capable of connecting to an audio device 37a for implementing IP telephone communications with another IP telephone terminal specified by a display name via an Internet 80; a network interface 38; and a USB interface 39 capable of connecting with an external device. The personal computer PC1 is also provided with other components such as a monitor (not shown) for displaying the user interfaces described with reference to FIG. 5 and the like, although a description of these devices has been omitted.

The CPU 31 controls the components of the personal computer PC1 based on fixed values and programs stored on the ROM 32, RAM 33, and HDD 34. The IP telephone application 24 described above is stored on the HDD 34.

While the personal computer PC1 is connected to a device 2 via a USB connection in the example of FIG. 17, it should be apparent that the personal computer PC1 can control a device connected on a LAN.

Next, a process will be described in which data acquired from the device 2 connected to the personal computer PC1 is processed on the device 70 connected to the personal computer PC2.

FIG. 18 is a sequence chart showing the sequence of steps executed according to programs on the IP telephone system of the second embodiment. First, the IP telephone application 24 performs a search for user devices on the Internet by issuing queries to IP telephone application installed on other personal computers (the IP telephone application 27 and the like).

The IP telephone application 27 and the like return user device data (registration data) including display names (an example of identification data) to the IP telephone application 24, and the IP telephone application 24 stores this registration data in the registration data storage area 5 (see FIG. 16).

Some systems may be provided with a special user device called a supernode for managing registration data of all IP telephone applications. In this case, the supernode returns the registration data for each IP telephone application in response to a search performed on the IP telephone application 24.

If a supernode exists in the system described in the first embodiment, the supernode would return registration data for each IP telephone application in response to a search performed by the IP telephone application 4.

In P21 the IP telephone application 24 of the personal computer PC1 performs a process to acquire a contact list based on registration data from other personal computers recorded in the registration data storage area 5. This process is substantially the same as the process described with reference to FIGS. 8, 9, and 11 in the first embodiment and will not be repeated here.

However, since the contact list acquisition process according to the first embodiment is performed with the intermediary application, the intermediary application acquires user device search results from the IP telephone application as described in S19 of FIG. 9. In the case of the second embodiment, the IP telephone application can directly search for user devices supporting an IP telephone application without going through the intermediary application.

In P22 the IP telephone application 24 performs a process to select a reception terminal and a desired function. This process is substantially identical to that described with reference to FIG. 13 in the first embodiment and will not be repeated here. However, the process described in FIG. 13 is executed with the intermediary application, while the process of the second embodiment is performed with the IP telephone application.

After the desired function is selected in this process, the IP telephone application 24 issues a data acquisition command based on this function to the device 2 connected to the personal computer PC1.

In P23 the device 2 acquires data to be processed with the selected function. For example, the device 2 may transfer image data scanned by the device 2 to the IP telephone application 24 of the personal computer PC1

In P24 the IP telephone application 24 performs a process to generate image data and command data to be transferred. This process was described with reference to FIG. 14 and will not be repeated here. However, the process described in FIG. 14 was executed with the intermediary application, while the process in the second embodiment is executed with the IP telephone application.

In P24 the IP telephone application 24 generates image data and command data to be transmitted based on the type of data to be processed on the destination device.

In P25 the IP telephone application 24 issues a command to the IP telephone application 27 of the device 2 to confirm data transmission authorization.

In P26 the IP telephone application 27 monitors incoming data for a command to confirm data transmission authorization. At this time, the IP telephone application 27 detects such a command when the command is transferred from the IP telephone application 24 and received by the IP telephone application 27.

In P27 the IP telephone application 27 performs a process to specify a location for saving reception data in response to detecting a command to confirm data transmission authorization received from the IP telephone application 24. Next, the IP telephone application 27 issues a command to the IP telephone application 24 to authorize data transmission.

In P28 the IP telephone application 24 monitors incoming data for a command authorizing data transmission and detects the data transmission authorization command when such a command is received from the IP telephone application 27.

In P29 the IP telephone application 24 executes a data transmission function. Specifically, the IP telephone application 24 in FIG. 16 transmits the data acquired in P23 with attached command data indicating the function provided on the device 11 from the file transmission unit 6 of the IP telephone application 24 to the file reception unit 9 of the IP telephone application 27 via IP telephone communications. In this way, the personal computer PC1 can transmit data that will be effectively used on the destination device.

In P30 the IP telephone application 27 waits for the transmission data and subsequently receives the data transmitted in P29.

In P31 the IP telephone application 27 interprets the command data within the data received from the IP telephone application 24, and outputs a data processing command for the selected function to the device 11 based on the interpreted command.

In P32 the device 11 performs a data process using the specified function based on the data processing command.

The program can display data related to another network terminal possessing a user-specified function and can effectively utilize processing resources indicated in the displayed data.

In P31 and P32 described above, the device 11 processes data acquired from the device 2 with the selected function. As a result, the resources of the IP telephone terminals on the data transmission side and data reception side can be effectively utilized.

As in the first embodiment described above, the personal computer PC1 according to the second embodiment displays the user interface described with reference to FIG. 5 when the user inputs an instruction in the IF telephone application 24 at a desired timing. Since the user interface of the second embodiment is identical to that in the first embodiment, differing only in that the user interface is displayed by the IP telephone application 24 rather than the intermediary application 3, the user interface of the IP telephone application 24 has been omitted from this description and the drawings.

Further, the process described in FIG. 6 is executed each time the highlighted display name for the user device changes in the user interface of FIG. 5.

Here, the process of FIG. 6 according to the second embodiment will be described. As in the first embodiment described above, in S12 of FIG. 6 the IP telephone application 24 acquires device data for the display name of the highlighted user device from the display name and profile.

In S13 the IP telephone application 24 determines whether or not the device data was successfully acquired. The IP telephone application 24 advances to S15 when the device data was successfully acquired (S13: YES) and advances to S14 when unsuccessful (S13: NO).

Figures 19A, 19B:
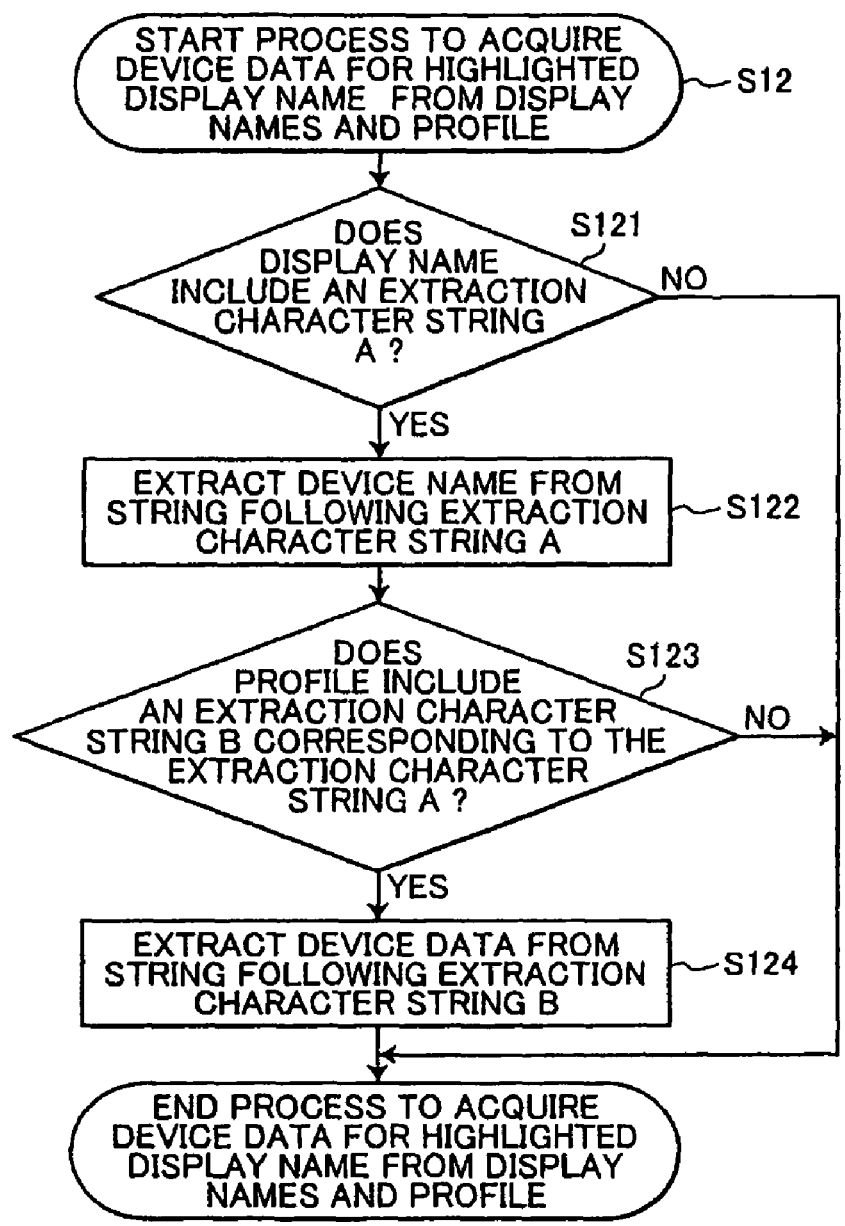
FIG. 19(a) is a flowchart illustrating detailed steps in the process of S12 shown in FIG. 6.
FIG. 19(b) is an explanatory diagram showing a sample list of extraction character strings.

FIG. 19(a) is a flowchart illustrating detailed steps for the process of S12. In S121 of FIG. 19(a) the IF telephone application 24 determines whether or not the highlighted display name includes a prestored extraction character string A (an example of the acquisition data).

FIG. 19(b) shows a sample list of extraction character strings. This list of extraction character strings is stored in advance on the HDD 34 of the personal computer PC1 (see FIG. 17). In the example of FIG. 19(b), "device" and "pc_" have been stored as extraction character strings suited to the display name.

When the display name includes a PC name such as "pc_" and "device" indicating a device name is included, as described with reference to FIG. 2, there is a high likelihood that the ensuing portion of the display name will include a PC name and device name.

If the display name includes an extraction character string (S121: YES), i.e., when the IP telephone application 24 determines that a PC name and device name are associated with the display name, in S122 the IP telephone application 24 removes (extracts) the device name from the character string immediately following the extraction character string.

In S123 the IP telephone application 24 acquires an extraction character string B corresponding to the extraction character string A detected in the display name and determines whether the extraction character string B exists in the profile.

If the profile includes the extraction character string B (S123: YES), in S124 the IP telephone application 24 removes the device data from the character string immediately following this extraction character string and returns to S15 of FIG. 6. As described above, a character string indicating the functions possessed by the device have been added to the device data (see FIG. 2).

In other words, through the above process, the IP telephone application 24 can acquire a device name associated with a display name received from another IP telephone terminal over the Internet, and can identify functions that the other IP telephone terminal having this display name can control based on the device name. Hence, the IP telephone application 24 can acquire the device name through a simple process of extracting the device name from the display name, avoiding unnecessary use of processing resources.

However, if the IP telephone application 24 makes a negative determination in either S121 or S123 (S121: N0 or S123: NO), i.e., when device data could not be acquired, the IP telephone application 24 returns to S14 of FIG. 6.

Although device data is included in the profile in the preferred embodiments described above, the device data may be included in the display name instead, for example. In this case, rather than determining whether or not the profile includes the extraction character string B in S123, the IP telephone application 24 may determine whether or not the display name includes the extraction character string B. When the display name includes the extraction character string B, in S124 the IP telephone application 24 can be configured to remove the device data from the character string in the display name immediately following the extraction character string B.

The device data may also be included in the display name in the first embodiment.

In S14 the IP telephone application 24 determines whether or not a device name stored in the device data list (see FIG. 2) is included in the highlighted display name and, if so, acquires the device data corresponding to this device name from the device data list.

FIG. 20 is a flowchart illustrating detailed steps for the process in S14 of FIG. 6. In S141 the IP telephone application 24 determines whether the highlighted display name includes one of the device names stored in the device data list.

If the display name does not include a device name stored in the device data list (S141: NO), the process ends. However, if the display name includes one of the device names stored in the device data list (S141: YES), in S142 the IP telephone application 24 extracts the device name from the display name. The process in S142 is an example of the terminal data acquiring means.

In S143 the IP telephone application 24 acquires device data corresponding to the extracted device name from the device data list, and subsequently returns to S15 of FIG. 6.

Since the device name is also included in the profile in the preferred embodiment, it is possible to determine in S141 whether or not the profile includes the device name rather than whether or not the display name includes the device name.

It is also possible to determine whether or not the device name is included in the profile in the first embodiment.

As in the first embodiment described above, in S15 the IP telephone application 24 displays the device name and device functions acquired in the "Device Data for the Selected User Device" of the user interface shown in FIG. 5, and subsequently ends the process.

As with the personal computer PC1 according to the first embodiment, the personal computer PC1 according to the second embodiment can easily use functions of other IP telephone terminals to effectively utilize the resources of the IP telephone system.

The other IP telephone terminal enables the own IP telephone terminal to receive terminal data identifying functions that can be controlled by the other IP telephone terminal. Therefore, the user of the own IP telephone terminal can be notified of functions that can be controlled by the other IP telephone terminal and, therefore, can effectively utilize these functions.

While the invention has been described in detail with reference to specific embodiments thereof, it would be apparent to those skilled in the art that many modifications and variations may be made therein without departing from the spirit of the invention, the scope of which is defined by the attached claims.

For example, while the devices connected to the personal computer are described as a scanner and printer in the preferred embodiments, the present invention may also be applied to a facsimile machine or other device.

The device may also be provided with a voice I/O function, such as a speaker and microphone. The user uses the speaker and microphone provided in the device to make a telephone call on an IP telephone, and the device data for the device implementing the telephone call is registered in the IP telephone application.

In this case, the IP telephone application outputs voice data received from another IP telephone terminal through the speaker of the device and transmits voice data inputted into the microphone of the device to the other IP telephone terminal.

In addition, the IP telephone application and the device are configured to transmit an event message to the intermediary application, and the intermediary application relays event messages from the IP telephone application to the device and messages from the device to the IP telephone application.

For example, when the IP telephone application receives a call request from another IP telephone terminal, the IP telephone application transfers a call request event to the device via the intermediary application. If the user operates the device to indicate acceptance of the call, this acceptance event is conveyed to the IP telephone application, after which the telephone call begins.

When the intermediary application acquires an instruction from the device indicating acceptance of the call, the application may assume all determinations in S1-S3 of FIG. 3 are "YES," and in S4-S7 may record the device data of the device from which the instruction to accept the call originated in the IP telephone application.

On the other hand, if the user operates the device to input an instruction to search for other user devices, the device conveys a search instruction event to the IP telephone application via the intermediary application, and the IP telephone application transmits a request over the Internet to search for user devices. After receiving a contact list as a result of this search, the IP telephone application transfers the contact list to the device via the intermediary application, and the device displays this list on a display unit.

At this time, the user can operate the device to select a call destination from the displayed contact list. When the user inputs a call instruction after selecting a contact, the device conveys a call request event to the IP telephone application via the intermediary application, and the IP telephone application transmits a call request to the IP telephone terminal at the call destination and subsequently waits for permission to implement the call.

Upon obtaining an instruction from the device requesting a telephone call, the intermediary application assumes that all determinations in S1-S3 of FIG. 3 are "YES," and in S4-S7 records device data for the device from which the instruction requesting a telephone call originated in the IP telephone application.

Further, the user interfaces in FIGS. 5 and 7 may be incorporated in the device. In this case, the user operates the user interface in FIG. 5 or FIG. 7 provided in the device to input instructions, which instructions are transferred to the IP telephone application via the intermediary application for performing searches and the like. The user may also operate the user interface in FIG. 7 provided on the device to input instructions for using a function provided on another IP telephone terminal, and the instruction is transferred to the intermediary application.

What is claimed is:

1. A non-transitory computer readable storage medium storing a computer-executable IP telephone cooperative program for controlling a computer operable to control a network terminal, which installs an IP telephone application program that causes the network terminal to function as: an identification data receiving unit that receives, over an Internet, identification data identifying another IP telephone terminal, the identification data including terminal data identifying functions of a device configured to be connected to the other IP telephone terminal and identifying the connection between the device and the other IP telephone terminal, and acquisition data indicating that the terminal data is included in the identification data; a communicating unit that establishes IP telephone communications with the other IP telephone terminal identified by the identification data received by the identification data receiving unit via the Internet; and an IP telephone function controlling unit that controls execution of an IP telephone function used to implement a telephone call with the other IP telephone terminal via the communicating unit, the IP telephone cooperative program comprising instructions for the computer to function as:

an identification data acquiring unit that acquires the identification data received by the identification data receiving unit;

a determining unit that determines from the identification data acquired by the identification data acquiring unit whether or not the acquisition data is included in the identification data acquired by the identification data acquiring unit;

a terminal data acquiring unit that acquires the terminal data included in the identification data acquired by the identification data acquiring unit, in case the determining unit determines that the acquisition data is included in the identification data;
a terminal data determining unit that determines the functions identified by the terminal data;
a function execution setting unit that sets execution of one of the functions of the device;
a process data acquiring unit that acquires the process data of a format to be processed by the function set by the function execution setting unit; and
a process data transmission controlling unit that controls transmission of the process data acquired by the process data acquiring unit to the other IP telephone terminal via the IP telephone communications.

2. The computer readable storage medium according to claim 1, the IP telephone cooperative program comprising instructions for the computer to function as:
a function selection unit that selects one of the functions of the device, and
wherein the function execution setting unit sets the execution of one of the functions selected by the function selection unit.

3. The computer readable storage medium according to claim 2, wherein the identification data receiving unit receives identification data identifying each of a plurality of other IP telephone terminals;
wherein the terminal data acquiring unit displays the terminal data acquired from each of the identification data;
wherein the function selection unit selects the function specified by the terminal data that the terminal data acquiring unit displays; and
wherein the process data transmission controlling unit transmits the process data used with the function selected by the function selection unit to the other IP telephone terminal that transmits the terminal data selected by the function selection unit.

4. The computer readable storage medium according to claim 3, the IP telephone cooperative program comprising instructions for the computer to function as a function specifying unit that receives input specifying a function,
wherein the terminal data acquiring unit displays the terminal data identifying the function specified by the function specifying unit among the terminal data acquired by each of the identification data.

5. The computer readable storage medium according to claim 2, wherein the terminal data acquiring unit displays data of a plurality of functions provided in the other IP telephone terminal transmitting the terminal data;
wherein the function selection unit selects specified function in any of functions displayed by the terminal data acquiring unit; and
wherein the process data transmission controlling unit transmits the process data used with the function selected by the function selection unit to the other IP telephone terminal that transmits the terminal data which identifies the function selected by the function selection unit.

6. A non-transitory computer readable storage medium storing a computer-executable program for controlling a computer operable to control an IP telephone terminal, the IP telephone terminal including: an identification data receiving unit that receives over an Internet identification data identifying another IP telephone terminal, the identification data including terminal data identifying functions of a device configured to be connected to the other IP telephone terminal and identifying the connection between the device and the other IP telephone terminal, and acquisition data indicating that the terminal data is included in the identification data; a communicating unit that establishes IP telephone communications with the other IP telephone terminal identified by the identification data received by the identification data receiving unit via the Internet; and an IP telephone function controlling unit that controls execution of an IP telephone function used to implement a telephone call with the other IP telephone terminal via the communicating unit;
the program comprising instructions for the computer to function as:
an identification data acquiring unit that acquires the identification data received by the identification data receiving unit;
a determining unit that determines from the identification data acquired by the identification data acquiring unit whether or not the acquisition data is included in the identification data acquired by the identification data acquiring unit;
a terminal data acquiring unit that acquires the terminal data included in the identification data acquired by the identification data acquiring unit, in case the determining unit determines that the acquisition data is included in the identification data;
a terminal data determining unit that determines the functions identified by the terminal data;
a function execution setting unit that sets execution of one of the functions of the device;
a process data acquiring unit that acquires the process data of a format to be processed by the function set by the function execution setting unit; and
a process data transmission controlling unit that controls transmission of the process data acquired by the process data acquiring unit to the other IP telephone terminal via the IP telephone communications.

7. A non-transitory computer readable storage medium storing a computer-executable program for controlling a computer operable to control an IP telephone terminal, the IP telephone terminal including: a storage; a connection interface configured to be connected to a device having functions; a storing unit that stores in the storage identification data identifying the IP telephone terminal for another IP telephone terminal; an identification data transmitting unit that transmits over an Internet the identification data stored in the storage to the other IP telephone terminal; a communicating unit that establishes IP telephone communications over the Internet with the other IP telephone terminal for which the identification data transmitted by the identification data transmitting unit identifies the terminal device as the IP telephone terminal; and, an IP telephone function controlling unit that controls the execution of an IP telephone function used to implement a telephone call with the other IP telephone terminal through the communicating unit;
the program comprising instructions for the computer to function as:
a function recognizing unit that recognizes the functions of the device connected to the IP telephone terminal via the connection interface;
an identification data acquiring unit that acquires the identification data from the storage;
a data adding unit that adds terminal data and acquisition data to the identification data acquired by the identification data acquiring unit, the terminal data identifying the functions of the device and the connection between the device and the IP telephone terminal, the acquisition data indicating that the terminal data is included in the identification data;

a registering unit that controls the storing unit to store in the storage the identification data including the terminal data and the acquisition data;

a process data receiving unit that receives process data of a format to be processed by the function recognized by the function recognizing unit; and a process data execution controlling unit that controls execution of the process data received by the process data receiving unit.

8. An IP telephone system comprising:

another IP telephone terminal on a network; and own IP telephone terminal comprising:

an identification data receiving unit that receives, over an Internet, identification data identifying the other IP telephone terminal, the identification data including terminal data identifying functions of a device configured to be connected to the other IP telephone terminal and identifying the connection between the device and the other IP telephone terminal, and acquisition data indicating that the terminal data is included in the identification data;

a communicating unit that establishes IP telephone communications with the other IP telephone terminal identified by the identification data received by the identification data receiving unit via the Internet;

an IP telephone function controlling unit that controls execution of an IP telephone function used to implement a telephone call with the other IP telephone terminal via the communicating unit;

a first identification data acquiring unit that acquires the identification data received by the identification data receiving unit;

a determining unit that determines from the identification data acquired by the first identification data acquiring unit whether or not the acquisition data is included in the identification data acquired by the first identification data acquiring unit;

a terminal data acquiring unit that acquires the terminal data included in the identification data acquired by the first identification data acquiring unit, in case the determining unit determines that the acquisition data is included in the identification data;

a terminal data determining unit that determines the functions identified by the terminal data;

a function execution setting unit that sets execution of one of the functions of the device;

a process data acquiring unit that acquires the process data of a format to be processed by the function set by the function execution setting unit; and a process data transmission controlling unit that controls transmission of the process data acquired by the process data acquiring unit to the other IP telephone terminal via the IP telephone communications; and the another IP telephone terminal comprising:

a storage;

a connection interface configured to be connected to the device having functions;

a storing unit that stores in the storage identification data identifying the other IP telephone terminal for the own IP telephone terminal;

an identification data transmitting unit that transmits over the Internet the identification data stored in the storage to the own IP telephone terminal;

a function recognizing unit that recognizes the functions of the device connected to the other IP telephone terminal via the connection interface;

a second identification data acquiring unit that acquires the identification data from the storage;

a data adding unit that adds terminal data and acquisition data to the identification data acquired by the second identification data acquiring unit, the terminal data identifying the functions of the device and the connection between the device and the other IP telephone terminal, the acquisition data indicating that the terminal data is included in the identification data; and, a registering unit that controls the storing unit to store in the storage the identification data including the terminal data and the acquisition data.

9. A non-transitory computer readable storage medium storing a computer-executable IP telephone cooperative program for controlling a computer operable to control a network terminal which installs an IP telephone application program for the network terminal to function as: an identification data receiving unit that receives over an Internet identification data identifying another IP telephone terminal, the identification data including terminal data identifying functions of a device configured to be connected to the other IP telephone terminal and identifying the connection between the device and the other IP telephone terminal, and acquisition data indicating that the terminal data is included in the identification data; a communicating unit that establishes IP telephone communications with the other IP telephone terminal identified by the identification data received by the identification data receiving unit via the Internet; and an IP telephone function controlling unit that controls execution of an IP telephone function used to implement a telephone call with the other IP telephone terminal via the communicating unit, the IP telephone cooperative program comprising instructions for the computer to function as:

an identification data acquiring unit that acquires the identification data received by the identification data receiving unit;

a determining unit that determines from the identification data acquired by the identification data acquiring unit whether or not the acquisition data is included in the identification data acquired by the identification data acquiring unit;

a terminal data acquiring unit that acquires the terminal data included in the identification acquired by the identification data acquiring unit, in case the determining unit determines that the acquisition data is included in the identification data;

a terminal data determining unit that determines the functions identified by the terminal data;

a function execution setting unit that sets execution of one of the functions of the device;

a process data acquiring unit that acquires the process data of a format to be processed by the function set by the function execution setting unit; and a process data transmission controlling unit that controls transmission of the process data acquired by the process data acquiring unit to the other IP telephone terminal via the IP telephone communications.

10. A non-transitory computer readable storage medium storing a computer-executable IP telephone cooperative program installed in a network terminal for controlling a computer operable to control the network terminal provided with a storage and a connection interface configured to be connected to a device having functions, the computer controlling the network terminal to function as: a storing unit that stores in the storage identification data identifying the network terminal as IP telephone terminal for another IP telephone terminal; an identification data transmitting unit that transmits over an Internet the identification data stored in the storage to the other IP telephone terminal; a communicating unit that establishes IP telephone communications with the other IP telephone terminal for which the identification data transmitted by the identification data transmitting unit identifies the terminal device as the IP telephone terminal via the Internet; and an IP telephone function controlling unit that controls execution of an IP telephone function used to implement a telephone call with the other IP telephone terminal via the communicating unit, the IP telephone cooperative program comprising instructions for the computer to function as:
a function recognizing unit that recognizes the functions of the device connected to the network terminal via the connection interface;
an identification data acquiring unit that acquires the identification data from the storage;
a data adding unit that adds terminal data and acquisition data to the identification data acquired by the identification data acquiring unit, the terminal data identifying the functions of the device and the connection between the device and the network terminal, the acquisition data indicating that the terminal data is included in the identification data;
a registering unit that controls the storing unit to store in the storage the identification data including the terminal data and the acquisition data;
a process data receiving unit that receives process data of a format to be processed by the function recognized by the function recognizing unit; and
a process data execution controlling unit that controls execution of the process data received by the process data receiving unit.

11. An IP telephone system comprising:
a plurality of IP telephone terminals including own IP telephone terminal and another IP telephone terminal, in which the own IP telephone terminal performs IP telephone call with the other IP telephone terminal with a communication unit and own IP telephone application program installed in the own IP telephone terminal, the communicating unit establishing IP telephone communications over an Internet with the other IP telephone terminal, and the IP telephone application program receiving identification data identifying each of the IP telephone terminal over the Internet, the identification data including terminal data identifying functions of a device configured to be connected to the other IP telephone terminal and identifying the connection between the device and the other IP telephone terminal, and acquisition data indicating that the terminal data is included in the identification data, and the IP telephone application program being configured to control the execution of an IP telephone function used to implement the telephone call with the other IP telephone terminal through the communicating unit;

wherein the own IP telephone terminal comprises:
a first identification data acquiring unit that acquires the identification data received by the IP telephone application program;
a determining unit that determines from the identification data acquired by the first identification data acquiring unit whether or not the acquisition data is included in the identification data acquired by the first identification data acquiring unit;
a terminal data acquiring unit that acquires the terminal data included in the identification data acquired by the first identification data acquiring unit, in case the determining unit determines that the acquisition data is included in the identification data;
a terminal data determining unit that determines the functions identified by the terminal data;
a function execution setting unit that sets execution of one of the functions of the device;
a process data acquiring unit that acquires the process data of a format to be processed by the function set by the function execution setting unit; and
a process data transmission controlling unit that controls transmission of the process data acquired by the process data acquiring unit to the other IP telephone terminal via the IP telephone communications performed by the communicating unit provided in the own IP telephone terminal; and the other IP telephone terminal comprising:
a storage;
a connection interface configured to be connected to the device having functions;
a storing unit that stores in the storage identification data identifying the other IP telephone terminal for the own IP telephone terminal;
an identification data transmitting unit that transmits over the Internet the identification data stored in the storage to the own IP telephone terminal;
a function recognizing unit that recognizes the functions of the device connected to the other IP telephone terminal via the connection interface;
a second identification data acquiring unit that acquires the identification data from the storage;
a data adding unit that adds terminal data and acquisition data to the identification data acquired by the second identification data acquiring unit, the terminal data identifying the functions of the device and the connection between the device and the other IP telephone terminal, the acquisition data indicating that the terminal data is included in the identification data; and,
a registering unit that controls the storing unit to store in the storage the identification data including the terminal data and the acquisition data.

12. A method of controlling an IP telephone system for implementing an IP telephone call between an own network terminal and another network terminal on a network or another telephone terminal connected to the other network terminal via an own IP telephone application installed on the own network terminal, the IP telephone call being performed with a communication unit and own IP telephone application program, the communicating unit establishing IP telephone communications over an Internet with the other network terminal or the other telephone terminal connected to the other network terminal, and the IP telephone application program receiving identification data identifying each of the IP telephone terminal over the Internet, the identification data including terminal data identifying functions of a device configured to be connected to the other network terminal or the other telephone terminal and identifying the connection between the device and the other network terminal or the other telephone terminal, and acquisition data indicating that the terminal data is included in the identification data, and the IP telephone application program being configured to control the execution of an IP telephone function used to implement the telephone call with the other network terminal or the other telephone terminal connected to the other network terminal through the communicating unit;

wherein in the own network terminal, the method comprises
(a) acquiring the identification data received by the IP telephone application program;
(b) determining from the identification data acquired by the acquisition whether or not the acquisition data is included in the identification data acquired by the first identification data acquiring unit;
(c) acquiring terminal data included in the identification data acquired by the acquisition (a) upon determining (b) that the acquisition data is included in the identification data;
(d) determining the functions identified by the terminal data;
(e) setting execution of one of the functions of the device;
(f) acquiring the process data of a format to be processed by the function set by the function execution setting unit; and
(g) controlling transmission of the process data acquired to the other IP telephone terminal via the IP telephone communications performed by the communicating unit provided in the own IP telephone terminal; and
wherein in the other network terminal or the other telephone terminal connected to the other network terminal, the method comprising the steps of
(h) transmitting over the Internet the identification data stored in a storage of the other network terminal or the other telephone terminal to the own network terminal;
(i) recognizing functions of the device connected to the other network terminal or the other telephone terminal connected to the other network terminal; and,
(j) registering in the storage the identification data including the terminal data and the acquisition data.

* * * * *